(12) United States Patent
Brice, Jr. et al.

(10) Patent No.: US 8,650,335 B2
(45) Date of Patent: Feb. 11, 2014

(54) MEASUREMENT FACILITY FOR ADAPTER FUNCTIONS

(75) Inventors: Frank W. Brice, Jr., Hurley, NY (US); David Craddock, New Paltz, NY (US); Beth A. Glendening, Poughkeepsie, NY (US); Thomas A. Gregg, Highland, NY (US); Eric N. Lais, Tillson, NY (US); Peter K. Szwed, Rhinebeck, NY (US); Steven G. Wilkins, Berkshire, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 12/821,193

(22) Filed: Jun. 23, 2010

(65) Prior Publication Data

US 2011/0320643 A1    Dec. 29, 2011

(51) Int. Cl.
    *G06F 3/00*    (2006.01)
(52) U.S. Cl.
    USPC .......................................................... 710/20
(58) Field of Classification Search
    USPC .......................................................... 710/20
    See application file for complete search history.

(56) References Cited

U.S. PATENT DOCUMENTS

| | | |
|---|---|---|
| 4,028,668 A | 6/1977 | Riikonen |
| 4,323,963 A | 4/1982 | Wu |
| 5,053,952 A | 10/1991 | Koopman, Jr. et al. |
| 5,170,472 A | 12/1992 | Cwiakala et al. |
| 5,265,240 A | 11/1993 | Galbraith et al. |
| 5,282,274 A | 1/1994 | Liu |
| 5,430,856 A | 7/1995 | Kinoshita |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |
| 5,574,873 A | 11/1996 | Davidian |
| 5,600,805 A | 2/1997 | Fredericks et al. |
| 5,617,554 A | 4/1997 | Alpert et al. |
| 5,742,785 A | 4/1998 | Stone et al. |
| 5,761,448 A | 6/1998 | Adamson et al. |
| 5,790,825 A | 8/1998 | Traut |
| 5,802,590 A | 9/1998 | Draves |

(Continued)

FOREIGN PATENT DOCUMENTS

| | | |
|---|---|---|
| EP | 0076921 A2 | 4/1983 |
| EP | 0552873 A1 | 7/1993 |

(Continued)

OTHER PUBLICATIONS

PCI Local Bus Specification Rev 3.0 Cover and p. 39, 44, 48-49, and 58 Aug. 12, 2002.*

(Continued)

*Primary Examiner* — Henry Tsai
*Assistant Examiner* — Eric Oberly
(74) *Attorney, Agent, or Firm* — John E. Campbell; Blanche E. Schiller, Esq.; Heslin Rothenberg Farley & Mesiti P.C.

(57) ABSTRACT

A measurement facility is provided for capturing and presenting fine-grained usage information for adapter functions in an input/output subsystem. Adapter specific input/output traffic is tracked on a per function basis and the results are dynamically presented to the user. This information is useful for performance tuning, load balancing and usage based charging, as examples.

20 Claims, 27 Drawing Sheets

(56) References Cited

U.S. PATENT DOCUMENTS

| | | | |
|---|---|---|---|
| 5,819,053 A * | 10/1998 | Goodrum et al. | 710/100 |
| 5,822,616 A | 10/1998 | Hirooka | |
| 5,826,084 A | 10/1998 | Brooks et al. | |
| 5,838,960 A | 11/1998 | Harriman, Jr. | |
| 5,870,598 A | 2/1999 | White et al. | |
| 5,875,463 A | 2/1999 | Crump et al. | |
| 5,901,312 A | 5/1999 | Radko | |
| 5,960,213 A | 9/1999 | Wilson | |
| 5,974,440 A | 10/1999 | Brooks et al. | |
| 6,009,261 A | 12/1999 | Scalzi et al. | |
| 6,023,736 A | 2/2000 | Lambeth et al. | |
| 6,067,595 A | 5/2000 | Lindenstruth | |
| 6,078,970 A | 6/2000 | Nordstrom et al. | |
| 6,205,530 B1 | 3/2001 | Kang | |
| 6,308,255 B1 | 10/2001 | Gorishek, IV et al. | |
| 6,330,647 B1 * | 12/2001 | Jeddeloh et al. | 711/158 |
| 6,330,656 B1 | 12/2001 | Bealkowski et al. | |
| 6,349,380 B1 | 2/2002 | Shahidzadeh et al. | |
| 6,408,347 B1 | 6/2002 | Smith et al. | |
| 6,463,582 B1 | 10/2002 | Lethin et al. | |
| 6,493,741 B1 | 12/2002 | Emer et al. | |
| 6,519,645 B2 | 2/2003 | Markos et al. | |
| 6,529,978 B1 | 3/2003 | Eide et al. | |
| 6,557,035 B1 | 4/2003 | McKnight | |
| 6,578,191 B1 | 6/2003 | Boehme et al. | |
| 6,581,130 B1 | 6/2003 | Brinkmann, Jr. et al. | |
| 6,615,305 B1 | 9/2003 | Olesen et al. | |
| 6,629,175 B1 | 9/2003 | Manning et al. | |
| 6,654,818 B1 | 11/2003 | Thurber | |
| 6,658,521 B1 | 12/2003 | Biran et al. | |
| 6,658,599 B1 | 12/2003 | Linam et al. | |
| 6,704,831 B1 | 3/2004 | Avery | |
| 6,715,011 B1 * | 3/2004 | Buckland et al. | 710/100 |
| 6,721,839 B1 | 4/2004 | Bauman et al. | |
| 6,751,752 B1 | 6/2004 | Smith | |
| 6,772,097 B1 * | 8/2004 | Kromenaker et al. | 702/186 |
| 6,772,264 B1 | 8/2004 | Dayan et al. | |
| 6,792,492 B1 | 9/2004 | Griffin | |
| 6,820,164 B2 | 11/2004 | Holm et al. | |
| 6,901,537 B2 | 5/2005 | Dawkins et al. | |
| 6,907,510 B2 | 6/2005 | Bennett et al. | |
| 6,963,940 B1 | 11/2005 | Glassen et al. | |
| 6,968,446 B1 | 11/2005 | McGrath | |
| 6,970,992 B2 | 11/2005 | Gurumoorthy et al. | |
| 6,978,338 B2 | 12/2005 | Wang et al. | |
| 6,996,638 B2 | 2/2006 | Brice, Jr. et al. | |
| 7,065,598 B2 | 6/2006 | Connor et al. | |
| 7,107,384 B1 | 9/2006 | Chen et al. | |
| 7,127,599 B2 | 10/2006 | Brice, Jr. et al. | |
| 7,130,938 B2 | 10/2006 | Brice, Jr. et al. | |
| 7,139,940 B2 | 11/2006 | Arbeitman et al. | |
| 7,174,550 B2 | 2/2007 | Brice, Jr. et al. | |
| 7,177,961 B2 | 2/2007 | Brice, Jr. et al. | |
| 7,200,704 B2 | 4/2007 | Njoku et al. | |
| 7,209,994 B1 | 4/2007 | Klaiber et al. | |
| 7,225,287 B2 | 5/2007 | Wooten | |
| 7,260,664 B2 | 8/2007 | Arndt et al. | |
| 7,277,968 B2 | 10/2007 | Brice, Jr. et al. | |
| 7,296,120 B2 | 11/2007 | Corrigan et al. | |
| 7,302,692 B2 | 11/2007 | Bae et al. | |
| 7,334,107 B2 | 2/2008 | Schoinas et al. | |
| 7,340,582 B2 | 3/2008 | Madukkarumukumana et al. | |
| 7,380,041 B2 | 5/2008 | Belmar et al. | |
| 7,398,343 B1 | 7/2008 | Marmash et al. | |
| 7,412,488 B2 | 8/2008 | Jha et al. | |
| 7,418,572 B2 | 8/2008 | Hepkin | |
| 7,420,931 B2 | 9/2008 | Nanda et al. | |
| 7,444,493 B2 | 10/2008 | Schoinas et al. | |
| 7,454,548 B2 | 11/2008 | Belmar et al. | |
| 7,464,191 B2 | 12/2008 | Arndt et al. | |
| 7,464,209 B2 | 12/2008 | Armstrong et al. | |
| 7,475,183 B2 | 1/2009 | Traut et al. | |
| 7,493,425 B2 | 2/2009 | Arndt et al. | |
| 7,496,707 B2 | 2/2009 | Freking et al. | |
| 7,502,872 B2 | 3/2009 | Boyd et al. | |
| 7,506,087 B2 | 3/2009 | Ho et al. | |
| 7,509,391 B1 | 3/2009 | Chauvel et al. | |
| 7,529,860 B2 | 5/2009 | Freimuth et al. | |
| 7,530,071 B2 | 5/2009 | Billau et al. | |
| 7,546,406 B2 | 6/2009 | Armstrong et al. | |
| 7,546,487 B2 | 6/2009 | Marisetty et al. | |
| 7,549,090 B2 | 6/2009 | Bailey et al. | |
| 7,552,298 B2 | 6/2009 | Bestler | |
| 7,562,366 B2 | 7/2009 | Pope et al. | |
| 7,567,567 B2 | 7/2009 | Muller et al. | |
| 7,587,531 B2 | 9/2009 | Brice, Jr. et al. | |
| 7,600,053 B2 | 10/2009 | Carlson et al. | |
| 7,606,965 B2 | 10/2009 | Njoku et al. | |
| 7,613,847 B2 | 11/2009 | Kjos et al. | |
| 7,617,340 B2 | 11/2009 | Gregg | |
| 7,617,345 B2 | 11/2009 | Clark et al. | |
| 7,623,460 B2 * | 11/2009 | Miyazaki | 370/235 |
| 7,624,235 B2 | 11/2009 | Wadhawan et al. | |
| 7,627,723 B1 | 12/2009 | Buck et al. | |
| 7,631,097 B2 | 12/2009 | Moch et al. | |
| 7,886,086 B2 | 2/2011 | Sharma et al. | |
| 8,505,032 B2 | 8/2013 | Craddock et al. | |
| 2001/0021971 A1 | 9/2001 | Gibson et al. | |
| 2002/0152334 A1 | 10/2002 | Holm et al. | |
| 2002/0161907 A1 | 10/2002 | Moon | |
| 2003/0056155 A1 | 3/2003 | Austen et al. | |
| 2003/0074541 A1 | 4/2003 | Plambeck | |
| 2004/0015622 A1 | 1/2004 | Avery | |
| 2004/0025166 A1 | 2/2004 | Adlung et al. | |
| 2004/0049600 A1 | 3/2004 | Boyd et al. | |
| 2004/0064618 A1 | 4/2004 | Farrell et al. | |
| 2004/0073905 A1 | 4/2004 | Emer et al. | |
| 2004/0117534 A1 * | 6/2004 | Parry et al. | 710/260 |
| 2004/0139304 A1 | 7/2004 | Arimilli et al. | |
| 2004/0139305 A1 | 7/2004 | Arimilli et al. | |
| 2004/0199700 A1 | 10/2004 | Clayton | |
| 2004/0236880 A1 | 11/2004 | Barrett | |
| 2005/0033895 A1 | 2/2005 | Lueck et al. | |
| 2005/0071472 A1 | 3/2005 | Arndt et al. | |
| 2005/0114586 A1 | 5/2005 | Brice, Jr. et al. | |
| 2005/0114623 A1 | 5/2005 | Craddock et al. | |
| 2005/0257100 A1 | 11/2005 | Anglin et al. | |
| 2005/0289271 A1 | 12/2005 | Martinez et al. | |
| 2006/0005083 A1 | 1/2006 | Genden et al. | |
| 2006/0064618 A1 | 3/2006 | Wu et al. | |
| 2006/0101181 A1 | 5/2006 | Post et al. | |
| 2006/0130071 A1 | 6/2006 | Martin et al. | |
| 2006/0195617 A1 | 8/2006 | Arndt et al. | |
| 2006/0195644 A1 | 8/2006 | Arndt et al. | |
| 2006/0230208 A1 | 10/2006 | Gregg et al. | |
| 2006/0253619 A1 | 11/2006 | Torudbakken et al. | |
| 2006/0281630 A1 | 12/2006 | Bailey et al. | |
| 2006/0288130 A1 | 12/2006 | Madukkarumukumana et al. | |
| 2007/0028087 A1 | 2/2007 | Yu et al. | |
| 2007/0073955 A1 | 3/2007 | Murray et al. | |
| 2007/0097871 A1 | 5/2007 | Boyd et al. | |
| 2007/0136554 A1 | 6/2007 | Biran et al. | |
| 2007/0168636 A1 | 7/2007 | Hummel et al. | |
| 2007/0168643 A1 | 7/2007 | Hummel et al. | |
| 2007/0168644 A1 | 7/2007 | Hummel et al. | |
| 2007/0168934 A1 | 7/2007 | Chandrasekharan et al. | |
| 2007/0174723 A1 | 7/2007 | Cardona et al. | |
| 2007/0186074 A1 | 8/2007 | Bradford et al. | |
| 2007/0226386 A1 | 9/2007 | Sharp et al. | |
| 2007/0234018 A1 | 10/2007 | Feiste | |
| 2007/0245041 A1 | 10/2007 | Hua et al. | |
| 2007/0260768 A1 | 11/2007 | Bender et al. | |
| 2007/0271559 A1 | 11/2007 | Easton et al. | |
| 2008/0091851 A1 | 4/2008 | Sierra | |
| 2008/0091868 A1 | 4/2008 | Mizrachi et al. | |
| 2008/0091915 A1 | 4/2008 | Moertl et al. | |
| 2008/0098197 A1 | 4/2008 | Craddock et al. | |
| 2008/0114734 A1 | 5/2008 | Suwabe | |
| 2008/0114906 A1 | 5/2008 | Hummel et al. | |
| 2008/0126648 A1 | 5/2008 | Brownlow et al. | |
| 2008/0126652 A1 | 5/2008 | Vembu et al. | |
| 2008/0148295 A1 | 6/2008 | Freimuth et al. | |
| 2008/0168208 A1 | 7/2008 | Gregg | |
| 2008/0222406 A1 | 9/2008 | Tabuchi | |

(56) References Cited

U.S. PATENT DOCUMENTS

| | | |
|---|---|---|
| 2008/0235425 A1 | 9/2008 | Belmar et al. |
| 2008/0263391 A1 | 10/2008 | Blinick et al. |
| 2008/0270853 A1 | 10/2008 | Chagoly et al. |
| 2009/0024823 A1 | 1/2009 | Ko et al. |
| 2009/0049220 A1 | 2/2009 | Conti et al. |
| 2009/0070760 A1 | 3/2009 | Khatri et al. |
| 2009/0089780 A1 | 4/2009 | Johnson et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0172211 A1 | 7/2009 | Perry et al. |
| 2009/0182966 A1 | 7/2009 | Greiner et al. |
| 2009/0182969 A1 | 7/2009 | Norgaard et al. |
| 2009/0210646 A1 | 8/2009 | Bauman et al. |
| 2009/0222814 A1 | 9/2009 | Astrand |
| 2009/0240849 A1 | 9/2009 | Corneli et al. |
| 2009/0249039 A1 | 10/2009 | Hook et al. |
| 2009/0276774 A1 | 11/2009 | Kinoshita |
| 2009/0276775 A1 | 11/2009 | Brown et al. |
| 2009/0328035 A1 | 12/2009 | Ganguly |
| 2010/0005234 A1 | 1/2010 | Ganga et al. |
| 2011/0099289 A1 | 4/2011 | Poggesi et al. |
| 2011/0138219 A1 | 6/2011 | Walton et al. |
| 2012/0239973 A1 | 9/2012 | Walton et al. |
| 2013/0067194 A1 | 3/2013 | Craddock et al. |

FOREIGN PATENT DOCUMENTS

| | | |
|---|---|---|
| EP | 0902355 A2 | 3/1999 |
| EP | 0955585 A2 | 11/1999 |
| EP | 1096376 A2 | 2/2001 |
| EP | 1489491 A1 | 12/2004 |
| JP | 57191826 A | 11/1982 |
| JP | 359081724 A | 5/1984 |
| JP | 362079557 A | 4/1987 |
| JP | 405053973 A | 3/1993 |
| JP | 510996 A | 4/1993 |
| WO | W09600940 A1 | 6/1995 |
| WO | W09938074 A1 | 7/1999 |
| WO | WO 02/41157 A2 | 5/2002 |

OTHER PUBLICATIONS

International Search Report and Written Opinion for PCT/EP2010/067039 dated Feb. 25, 2011.
International Search Report and Written Opinion for PCT/EP2010/067036 dated Feb. 14, 2011.
International Search Report and Written Opinion for PCT/EP2010/067030 dated Feb. 7, 2011.
International Search Report and Written Opinion for PCT/EP2010/067020 dated Apr. 5, 2011.
International Search Report and Written Opinion for PCT/EP2010/067025 dated Apr. 13, 2011.
International Search Report and Written Opinion for PCT/EP2010/067024 dated Apr. 27, 2011.
International Search Report and Written Opinion for PCT/EP2010/067019 dated Apr. 26, 2011.
International Search Report and Written Opinion for PCT/EP2010/067021 dated Apr. 28, 2011.
International Search Report and Written Opinion for PCT/EP2010/067043 dated Apr. 21, 2011.
International Search Report and Written Opinion for PCT/EP2010/067041 dated Apr. 26, 2011.
International Search Report and Written Opinion for PCT/EP2010/067031 dated Apr. 26, 2011.
International Search Report and Written Opinion for PCT/EP2010/067034 dated May 18, 2011.
International Search Report and Written Opinion for PCT/EP2010/067023 dated Jun. 15, 2011.
International Search Report and Written Opinion for PCT/EP2010/067032 dated May 27, 2011.
International Search Report and Written Opinion for PCT/EP2010/067038 dated Jun. 15, 2011.
"Chapter 6: Configuration Space" in PCI-SIG: "PCI Local Bus Specification Revision 3.0", Feb. 2004, pp. 213-254.
Rennet, P. et al., "Programmable Interrupt Vectors in Processors," IBM Technical Disclosure Bulletin, vol. 25, No. 5, Oct. 1, 1982, pp. 2641-2642.
Plambeck et al., "Development and Attributes of z/Architecture," IBM Journal of Research and Development, IBM Corporation, vol. 46, No. 4/05, Jul. 1, 2002, pp. 367-379.
"z/Architecture Principles of Operation, Chapter 3", Feb. 2008, pp. 1-71.
Gehringer, E. F., et al., "Virtual Memory Systems," CSC-506—Architecture of Parallel Computers Computer Science Department, College of Engineering, North Carolina, Dec. 31, 1999, XP002631523.
"z/Architecture—Principles of Operation," IBM Publication No. SA22-7832-05, Sixth Edition, Apr. 2007, Chapter 10, 10-1-10-138.
"PCI Local Bus Specification," Mar. 29, 2002, pp. 1-328.
"Decreased Latency Across PCI Express With I/O Virtualization Via a Hint Interface," IPCOM000185226D, Jul. 16, 2009, pp. 1-2.
Office Action for U.S. Appl. No. 12/821,182 dated Oct. 13, 2011.
McGee, H.T., "Technique for Resetting a Single Channel Path Under Operator Control in IBM System/370XA," IBM Technical Disclosure Bulletin, vol. 26, No. 10B, Mar. 1984.
Kamil et al., "Discussion #8 Topics: Paging, Multilevel Paging," Mar. 2004, pp. 1-3.
Office Action for U.S. Appl. No. 12/821,172 dated Dec. 12, 2011.
Office Action for U.S. Appl. No. 12/821,185 dated Dec. 20, 2011.
U.S. Appl. No. 12/708,284, "Load Pair Disjoint Facility and Instruction Therefore," filed Jun. 24, 2010.
U.S. Appl. No. 12/820,735, "High-Word Facility for Extending the Number of General Purpose Registers Available to Instructions," filed Jun. 22, 2010.
U.S. Appl. No. 12/820,768, "Instructions for Performing an Operation on Two Operands and Subsequently Storing an Original Value of Operand," filed Jun. 22, 2010.
U.S. Appl. No. 12/821,224, "Associating Input/Output Device Requests With Memory Associated With a Logical Partition," filed Jun. 21, 2010.
U.S. Appl. No. 12/821,239, "Input/Output (I/O) Expansion Response Processing in a Peripheral Component Interconnect Express (PCIE) Environment," filed Jun. 23, 2010.
U.S. Appl. No. 12/821,242, "A System and Method for Downbound I/O Expansion Request and Response Processing in a PCIe Architecture," filed Jun. 23, 2010.
U.S. Appl. No. 12/821,243, "Upbound Input/Output Expansion Request and Response Processing in a PCIE Architecture," filed Jun. 23, 2010.
U.S. Appl. No. 12/821,245, "A System and Method for Routing I/O Expansion Requests and Responses in a PCIE Architecture," filed Jun. 23, 2010.
U.S. Appl. No. 12/821,247, "Scalable 110 Adapter Function Level Error Detection, Isolation, and Reporting," filed Jun. 23, 2010.
U.S. Appl. No. 12/821,248, "Connected Input/Output HUB Management," filed Jun. 23, 2010.
U.S. Appl. No. 12/821,256, "Switch Failover Control in a Multiprocessor Computer System," filed Jun. 23, 2010.
U.S. Appl. No. 12/821,271, "Memory Error Isolation and Recovery in a Multiprocessor Computer System," filed Jun. 23, 2010.
U.S. Appl. No. 12/822,358, "Function Virtualization Facility for Function Query of a Processor," filed Jun. 24, 2010.
U.S. Appl. No. 12/822,368, "Function Virtualization Facility for Blocking Instruction Function of a Multi-Function Instruction of a Virtual Processor," filed Jun. 24, 2010.
Craddock et al., U.S. Appl. No. 12/821,170, "Translation of Input/Output Address to Memory Addresses" filed Jun. 23, 2010.
Craddock et al., U.S. Appl. No. 12/821,171, "Runtime Determination of Translation Formats for Adapter Functions," filed Jun. 23, 2010.
Craddock et al., U.S. Appl. No. 12/821,172, "Resizing Address Spaces Concurrent to Accessing the Address Spaces," filed Jun. 23, 2010.

(56) References Cited

OTHER PUBLICATIONS

Craddock et al., U.S. Appl. No. 12/821,174, "Multiple Address Spaces Per Adapter," filed Jun. 23, 2010.
Craddock et al., U.S. Appl. No. 12/821,175, "Converting a Message Signaled Interruption Into an I/O Adapter Event Notification," filed Jun. 23, 2010.
Brice et al., U.S. Appl. No. 12/821,177, "Converting a Message Signaled Interruption Into an I/O Adapter Event Notification to a Guest Operating System," filed Jun. 23, 2010.
Craddock et al., U.S. Appl. No. 12/821,178, "Identification of Types of Sources of Adapter Interruptions," filed Jun. 23, 2010.
Belmar et al., U.S. Appl. No. 12/821,179, "Controlling a Rate At Which Adapter Interruption Requests Are Processed," filed Jun. 23, 2010.
Craddock et al., U.S. Appl. No. 12/821,181, "Controlling the Selectively Setting of Operational Parameters for an Adapter," filed Jun. 23, 2010.
Craddock et al., U.S. Appl. No. 12/821,182, "Load Instruction for Communicating With Adapters," filed Jun. 23, 2010.
Craddock et al., U.S. Appl. No. 12/821,184, "Controlling Access by a Configuration to an Adapter Function," filed Jun. 23, 2010.
Coneski et al., U.S. Appl. No. 12/821,185, "Discovery by Operating System of Information Relating to Adapter Functions Accessible to the Operating System," filed Jun. 23, 2010.
Coneski et al., U.S. Appl. No. 12/821,187, "Enable/Disable Adapters of a Computing Environment," filed Jun. 23, 2010.
Craddock et al., U.S. Appl. No. 12/821,190, "Guest Access to Address Spaces of Adapter," filed Jun. 23, 2010.
Coneski et al., U.S. Appl. No. 12/821,191, "Managing Processing Associated With Hardware Events," filed Jun. 23, 2010.
Craddock et al., U.S. Appl. No. 12/821,192, "Operating System Notification of Actions to Be Taken Responsive to Adapter Events," filed Jun. 23, 2010.
Craddock et al., U.S. Appl. No. 12/821,194, "Store/Store Block Instructions for Communicating With Adapters," filed Jun. 23, 2010.
Paulsen, Eric; "Local Memory Coaxes Top Speed from SCSI Masters," Electronic Design, V. 41, Apr. 15, 1993, pp. 76-6+.
Ganapathy, Narayanan; "General Purpose Operating System Support for Multiple Page Sizes," USENIX Annual Technical Conference (No. 98), 1998, pp. 91-104.
Talluri et al., "A New Page Table for 64-bit Address Spaces," ACM SIGOPS Operating Systems Review, vol. 29, Issue 5 (Dec. 1995), pp. 194-200.
"Large Page Support in the Linux Kernel," http://lwn.net/Articles/6969/ <retrieved on Jan. 26, 2010>.
Crawford, Catherine H. et al., "Accelerating Computing with the Cell Broadband Engine Processor," May 2008, CF '08, May 5-7, 2008, Ischia, Italy, pp. 3-11.
Baumann, Andrew, et al., "The Multikernel: A New OS Architecture for Scalable Multicore Systems," Oct. 2009, SOSP '09, Oct. 11-14, 2009, Big Sky, Montana, USA, pp. 29-43.
Swift, Michael M. et al., "Improving the Reliability of Commodity Operating Systems," ACM Transactions on Computer Systems, vol. 23, No. 1, Feb. 2005, pp. 77-110.
Xu, Min et al., "Towards a VMM-based Usage Control Framework for OS Kernel Integrity Protection," SACMAT '07, Jun. 20-22, 2007, Sophia Antipolis, France, pp. 71-80.
Huang, Wei et al., "A Case for High Performance Computing with Virtual Machines," ISC '06, Jun. 3 28 30, Carins, Queensland, Australia, pp. 125-134, Jun. 3, 2006.
Mysore, Shashidhar et al., "Understanding and Visualizing Full Systems with Data Flow Tomography," SPOLOS '08, Mar. 1-5, 2008, Seattle, Washington, USA, pp. 211-221.
"DMA Engines Bring Multicast to PCI Express Systems," http://electronicdesign.com, Aug. 13, 2009, 3 pages.
"Xen Wiki," http://wiki.xensource.com/xenwiki/VTdHowTo, 5 pages, Apr. 16, 2010.
Vaidyanathan, K., et al., "Exploiting RDMA Operations for Providing Efficient Fine-Grained Resource Monitoring in Cluster-based Servers," 1-4244-0328—Jun. 2006, 10 pages.

"IBM Enhances the IBM eServer zSeries 990 Family of Servers," Hardware Announcement, Oct. 7, 2003, pp. 1-11.
"Intel® Virtualization Technology for Directed I/O," Intel® Technology Journal, vol. 10, Issue 3, Aug. 10, 2006.
"I/O Virtualization and AMD's IOMMU," AMD Developer Central, http://developer.amd.com/documentation/articles/pages/892006101.aspx, Aug. 9, 2006.
"z/Architecture Principles of Operation," IBM Publication No. SA22-7832-07, Feb. 2009.
"z/VM: Running Guest Operating Systems," IBM Publication No. SC24-5997-02, Oct. 2001.
"z/VM: General Information Manual," IBM Publication No. GC24-5991-05, May 2003.
Winwood, Simon, et al., "Multiple Page Size Support in the Linux Kernel", Proceedings of Ottawa Linux Symposium, 2002.
"z/Architecture Principles of Operation," Chapter 17, pp. 17-1-17-30, IBM Publication No. SA22-7832-07, Feb. 2009.
"Intel® Itanium® Architecture Software Developer's Manual," vol. 2, Rev. 2.2, Jan. 2006.
Office Action for U.S. Appl. No. 12/821,174 dated Jan. 19, 2012.
Final Office Action for U.S. Appl. No. 12/821,184 dated Jan. 24, 2012.
Office Action for U.S. Appl. No. 12/821,187 dated Feb. 28, 2012.
Final Office Action for U.S. Appl. No. 12/821,171 dated Mar. 29, 2012.
Final Office Action for U.S. Appl. No. 12/821,185 dated Jun. 6, 2012.
"Atari PCI BIOS and Device Drive Specification 1.13," Chapters 2, 3, 4 and 6; [online], internet archive dates Dec. 12, 2007 and Feb. 8, 2007; retrieved on May 24, 2012, 13 pages <URL:http://kunden.wvnet.at/fichti/docs/pcibios-2.htm; pcibios-3.htm; pcibios-4.htm, pcibios-6.htm>.
"PCI Device Access Under 32-bit PM DOS from Open Watcom," [online], internet archive date Jul. 19, 2006; retrieved May 26, 2012, 14 pages <URL:http://www.openwatcom.org/index.php/PCI_Device_acces_under_32-Bit_PM_DOS>.
Device Identification Strings from OSR online; [online], internet archive date Mar. 13, 2005; retrieved May 26, 2012, 3 pages <URL:http//www.osronline.com/ddkx/install/idstrings_8tt3.htm>.
Office Action for U.S. Appl. No. 12/821,190 dated Jun. 12, 2012.
Office Action for U.S. Appl. No. 12/821,174 dated Jun. 15, 2012.
International Search Report and Written Opinion for PCT/EP2010/067035 dated Mar. 8, 2011.
Final Office Action for U.S. Appl. No. 12/821,187 dated Jul. 16, 2012.
Office Action for U.S. Appl. No. 12/821,191 dated Jul. 18, 2012.
Office Action for U.S. Appl. No. 12/821,171 dated Jul. 19, 2012.
Office Action for U.S. Appl. No. 12/821,192 dated Oct. 11, 2012.
International Search Report and Written Opinion for PCT/EP2010/067029 dated Mar. 2, 2011.
"IBM System/390 I/O Call Reporting Process," IBM Technical Disclosure Bulletin, vol. 36, No. 1, Jan. 1993, pp. 164-169, XP000222812.
"Means for Channel Subsystem-Initiated Communication," IBM Technical Disclosure Bulletin, vol. 33, No. 12, May 1991, p. 169, XP000121623.
International Search Report and Written Opinion for PCT/EP2010/067028 dated Mar. 8, 2011.
International Search Report and Written Opinion for PCT/EP2010/067042 dated Apr. 28, 2011.
Communication Pursuant to Article 94(3) EPC for Application No. 10 776 350.0-2212 dated Oct. 31, 2012.
Final Office Action for U.S. Appl. No. 12/821,174 dated Nov. 13, 2012.
Office Action for U.S. Appl. No. 12/821,170 dated Feb. 1, 2013, pp. 1-28.
Office Action for U.S. Appl. No. 13/672,028 dated Feb. 1, 2013, pp. 1-20.
Communication Pursuant to Article 94(3) EPC for Application No. 10 784 272.6-1243 dated Feb. 6, 2013, pp. 1-7.
Final Office Action for U.S. Appl. No. 12/821,171 dated Mar. 18, 2013, pp. 1-11.

(56) References Cited

OTHER PUBLICATIONS

Office Action for U.S. Appl. No. 12/821,181 dated Mar. 26, 2013, pp. 1-37.
Notice of Allowance for U.S. Appl. No. 12/821,172 dated Apr. 30, 2013, pp. 1-30.
Communication Pursuant to Article 94(3) EPC for Application No. 10 776 345.0-1956, dated May 31, 2013, pp. 1-6.
Communication Pursuant to Article 94(3) EPC for Application No. 10 778 994.3-1960, dated Jul. 3, 2013, pp. 1-7.
Office Action for U.S. Appl. No. 12/821,190 dated Sep. 4, 2013, pp. 1-6.

* cited by examiner

MEASUREMENT FACILITY FOR ADAPTER FUNCTIONS

BACKGROUND

This invention relates, in general, to input/output processing, and in particular, to measuring resource usage related to input/output processing.

In large computing systems, a measurement facility is often available that provides information about traffic through the input/output (I/O) infrastructure. Such information is useful for tuning program performance, load balancing, and for billing users based on resource usage.

As one particular example, in System z® machines offered by International Business Machines Corporation, utilities are provided to obtain information about traffic flowing through the I/O infrastructure, which is referred to as the channel subsystem. The channel subsystem provides a consistent interface for channel access across channel types and various I/O subsystem transports. This interface, referred to as the Start Subchannel Call instruction, is executed by firmware on behalf of the user. The firmware hides details of the physical channel from the user and is provided utilities, such as a measurement utility, to track resource usage.

With other I/O infrastructures, however, the details of the physical channel are exposed to the user and facilities provided by those infrastructures that hide the details are not available.

BRIEF SUMMARY

Certain I/O infrastructures, such as PCI Express, do not specify a standard interface for measuring subsystem activity. However, the ability to measure I/O traffic is a desired function. Therefore, in accordance with an aspect of the present invention, a measurement facility is provided for adapter functions, such as PCI functions.

The shortcomings of the prior art are overcome and advantages are provided through the provision of a computer program product for measuring resource usage in a computing environment. The computer program product includes a computer readable storage medium readable by a processing circuit and storing instructions for execution by the processing circuit for performing a method. The method includes, for instance, executing a Modify PCI Function Controls (MPFC) instruction including a function handle for identifying an adapter, the MPFC specifying a location in memory for tracking information; determining that an adapter function of the computing environment is being accessed via an instruction or requesting access of system memory coupled to the adapter function; tracking information specific to the adapter function, wherein the tracking information includes a count of determined accessing instructions or a count of determined requested accesses to memory, wherein the tracked information is on a per-adapter function basis; and storing the tracking information in the location in memory.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a measurement facility is provided for capturing and presenting fine-grained usage information for an input/output (I/O) subsystem that includes adapters, such as PCI Express adapters. This information is useful for performance tuning, load balancing and usage-based charging, as examples. In one particular example, adapter specific I/O traffic is tracked on a per-adapter function basis and the results are dynamically presented to the user. For example, on a per-adapter function basis, adapter access instructions are tracked and direct memory access traffic is tallied. The access instructions are tracked by, for instance, firmware of a processor, and the direct memory access traffic is tallied by, for instance, hardware counters. The I/O subsystem dynamically presents the measurement values to the user by updating a control block at a user specified memory location. The measurements are device independent in that the types of devices (e.g., adapters) do not need to be known beforehand.

As used herein, the term adapter includes any type of adapter (e.g., storage adapter, network adapter, processing adapter, PCI adapter, cryptographic adapter, other type of input/output adapters, etc.). In one embodiment, an adapter includes one adapter function. However, in other embodiments, an adapter may include a plurality of adapter functions. One or more aspects of the present invention are applicable whether an adapter includes one adapter function or a plurality of adapter functions. Moreover, in the examples presented herein, adapter is used interchangeably with adapter function (e.g., PCI function) unless otherwise noted.

Figure 1:
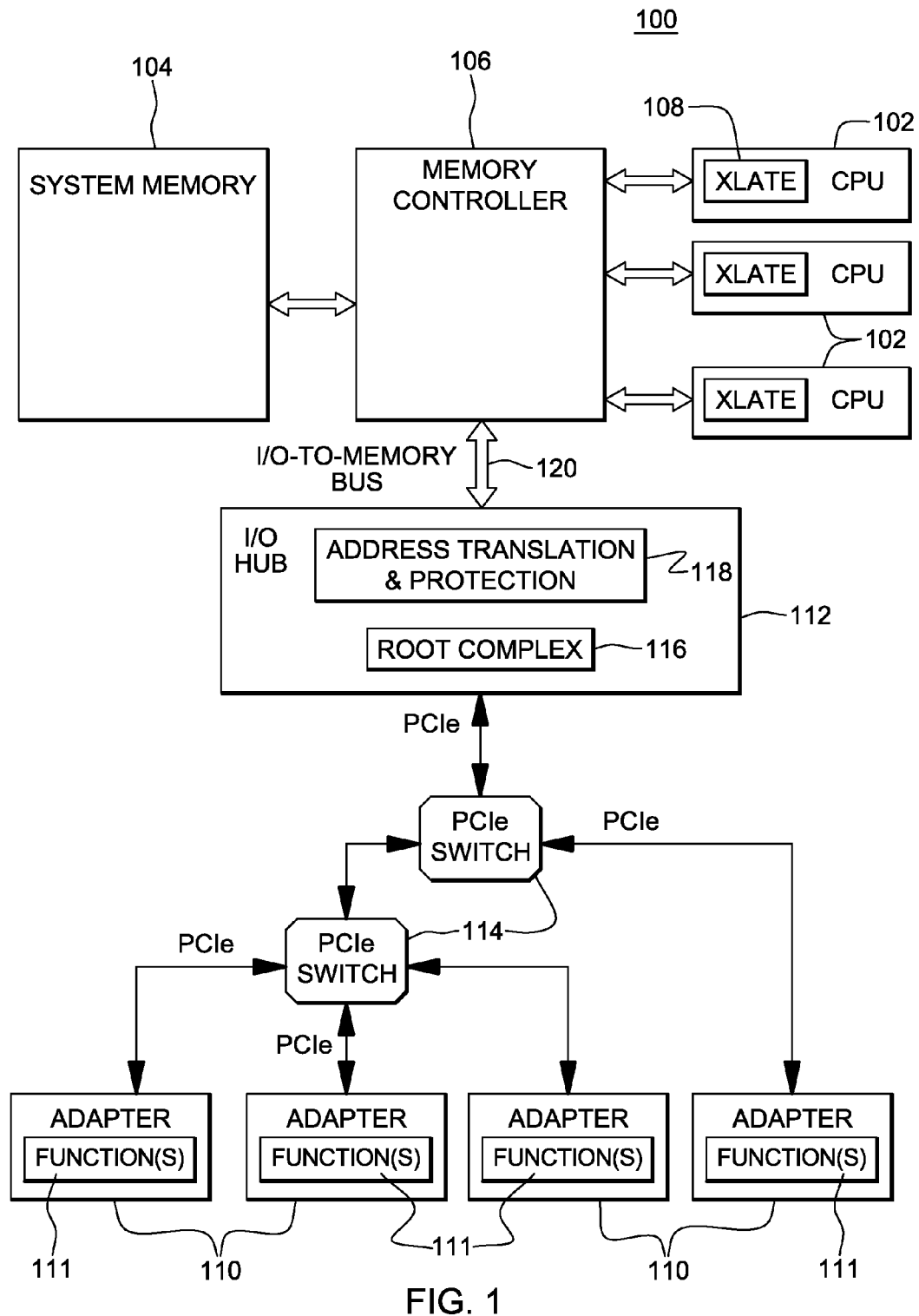
FIG. 1 depicts one embodiment of a computing environment to incorporate and use one or more aspects of the present invention.

One embodiment of a computing environment to incorporate and use one or more aspects of the present invention is described with reference to FIG. 1. In one example, a computing environment 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z® and z/Architecture® are registered trademarks of International Business Machines Corporation, Armonk, N.Y. Other names used herein may be registered trademarks, trademarks or product names of International Business Machines Corporation or other companies.

In one example, computing environment 100 includes one or more central processing units (CPUs) 102 coupled to a system memory 104 (a.k.a., main memory) via a memory controller 106. To access system memory 104, a central processing unit 102 issues a read or write request that includes an address used to access system memory. The address included in the request is typically not directly usable to access system memory, and therefore, it is translated to an address that is directly usable in accessing system memory. The address is translated via a translation mechanism (XLATE) 108. For example, the address is translated from a virtual address to a real or absolute address using, for instance, dynamic address translation (DAT).

The request, including the address (translated, if necessary), is received by memory controller 106. In one example, memory controller 106 is comprised of hardware and is used to arbitrate for access to the system memory and to maintain the memory's consistency. This arbitration is performed for requests received from CPUs 102, as well as for requests received from one or more adapters 110. Like the central processing units, the adapters issue requests to system memory 104 to gain access to the system memory.

In one example, adapter 110 is a Peripheral Component Interconnect (PCI) or PCI Express (PCIe) adapter that includes one or more PCI functions 111. A PCI function issues a request that is routed to an input/output hub 112 (e.g., a PCI hub) via one or more switches (e.g., PCIe switches) 114. In one example, the input/output hub is comprised of hardware, including one or more state machines, and is coupled to memory controller 106 via an I/O-to-memory bus 120.

The input/output hub includes, for instance, a root complex 116 that receives the request from a switch. The request includes an input/output address that is provided to an address translation and protection unit 118 which accesses information used for the request. As examples, the request may include an input/output address used to perform a direct memory access (DMA) operation or to request a message signaled interruption (MSI). Address translation and protection unit 118 accesses information used for the DMA or MSI request. As a particular example, for a DMA operation, information may be obtained to translate the address. The translated address is then forwarded to the memory controller to access system memory.

In one example, information used for the DMA or MSI request issued by an adapter function is obtained from a device table entry located in the I/O hub (e.g., in the address translation and protection unit). The device table entry includes information for the adapter function, and each adapter function has at least one device table entry associated therewith. For instance, there is one device table entry per address space assigned to the adapter function. For requests issued from adapter functions, a device table entry is located using a requestor ID (specifying, for instance, a bus number, device number and function number) provided in the request.

In addition to the adapters, and specifically the adapter functions, issuing requests, the adapters, particularly the adapter functions, can be accessed by processors 102. This access is via instructions issued by the processors. In this example, the instructions are specific to the I/O infrastructure. That is, since the I/O infrastructure is based on PCI or PCIe, the instructions are PCI instructions. Example PCI instructions include PCI Load, PCI Store, PCI Store Block, PCI Modify, and PCI Refresh Translations, to name a few. Although, in this example, the I/O infrastructure and instructions are based on PCI, in other embodiments, other infrastructures and corresponding instructions may be used.

For requests that are issued by processors to the adapter functions, a function table entry associated with the adapter function is referenced. The function table entry, which is stored in secure memory and located using a function handle, includes characteristics of the adapter function. In one example, the function handle includes an enable indicator indicating whether the handle is enabled; a function number that identifies the function (this is a static identifier and may be used as an index into the function table); and an instance number specifying the particular instance of this function handle.

In accordance with an aspect of the present invention, a capability is provided in which on a per-function basis (adapter function and function are used interchangeably herein) the execution of one or more PCI specific instructions are automatically counted, and the amount of data transferred to and from system memory by the adapter function is measured. Further, a capability is provided for periodically dynamically updating system memory with the current measurement values.

One embodiment of the logic to track PCI access instructions is described with reference to FIG. 2. An access instruction is an instruction that accesses an adapter function (e.g., an address space of the adapter function) or performs an action on behalf of the adapter function (e.g., populates or modifies a device table entry). In one example, these instructions are implemented using firmware of a processor, and therefore, the firmware is performing the instruction tracking. As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Figure 2:
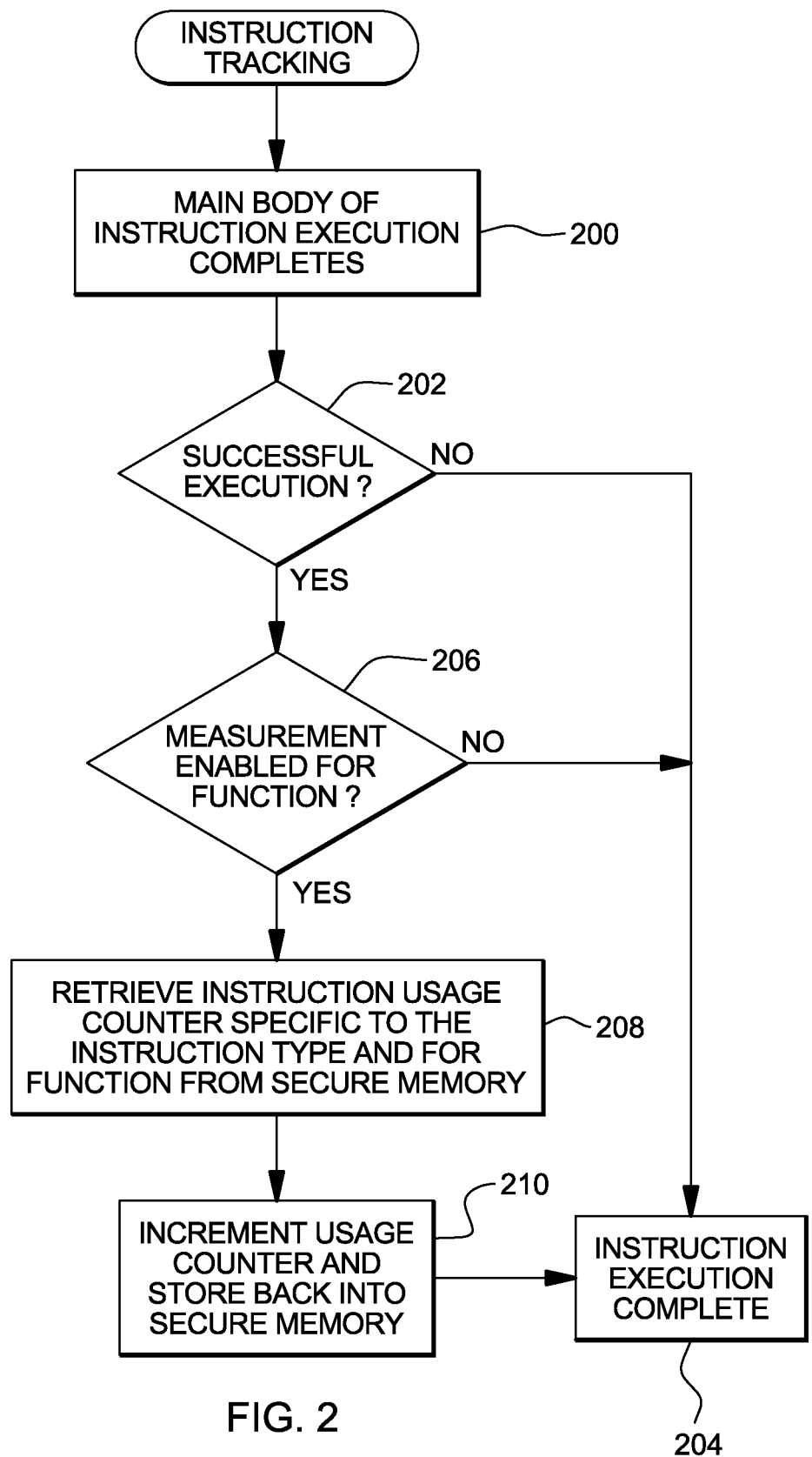
FIG. 2 depicts one embodiment of the logic to track instructions, in accordance with an aspect of the present invention.

Referring to FIG. 2, initially the main body of instruction execution completes, STEP 200. That is, a PCI instruction, such as a Load, Store, Store Block, Modify or Refresh Translations instruction, issued by a processor to perform an operation for a specified adapter function is executed and the main body of that instruction completes.

Thereafter, a determination is made as to whether execution of the main body of the instruction was successful, INQUIRY 202. This determination is made by, for example, checking status associated with the instruction (e.g., returned by the I/O hub). If execution was not successful, then instruction execution completes, STEP 204, and tracking is not provided, in this embodiment, for that instruction. (In other embodiments, failed instructions may also be counted.) However, if execution is successful, then a further determination is made as to whether measurement is enabled for this adapter function, INQUIRY 206. That is, in one example, measurement can be enabled on a per-adapter function basis by setting a measurement enable indicator in a control block associated with the adapter function. If measurement is not enabled, then once again instruction execution completes without any tracking, STEP 204.

Figure 3:
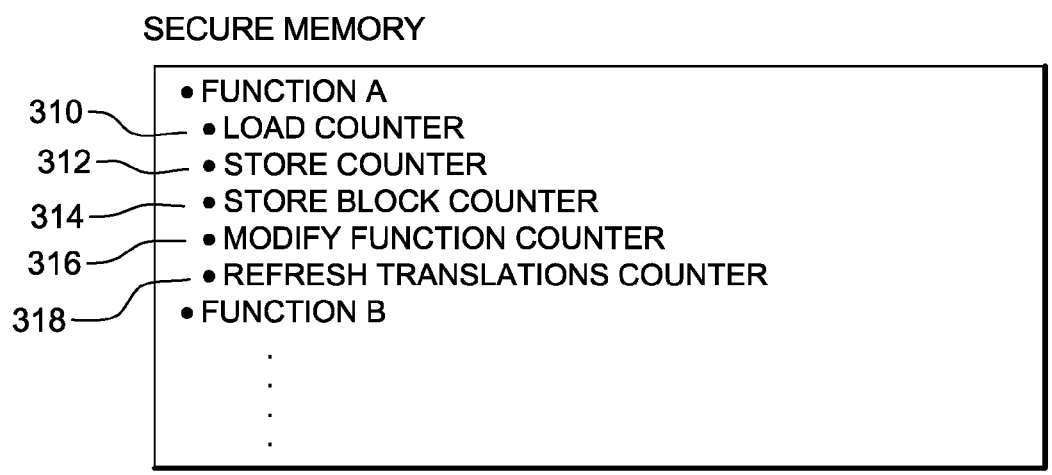
FIG. 3 depicts one embodiment of counters associated with a function, in accordance with an aspect of the present invention.

However, if measurement is enabled for the function, then an instruction usage counter is retrieved for the function from secure memory, STEP 208. For instance, in one embodiment, there are a plurality of counters for each function. As shown in FIG. 3, a Function A includes a plurality of counters, such as, for instance, a load counter 310, a store counter 312, a store block counter 314, a modify function counter 316, and a refresh translations counter 318. Each of these counters corresponds to a type of PCI instruction that may be used to access the PCI function and for which tracking is desired. A determination is made as to which type of instruction was executed and the counter corresponding to the instruction that just successfully executed is retrieved. For instance, if it was a load instruction that was executed, then load counter 310 is retrieved from secure memory. More, less or different counters and/or instructions may be used and/or tracked in other embodiments.

Returning to FIG. 2, subsequent to retrieving the appropriate instruction usage counter, it is incremented (e.g., by one) and stored back into secure memory, STEP 210. This completes the instruction execution, STEP 204.

Figure 4A:
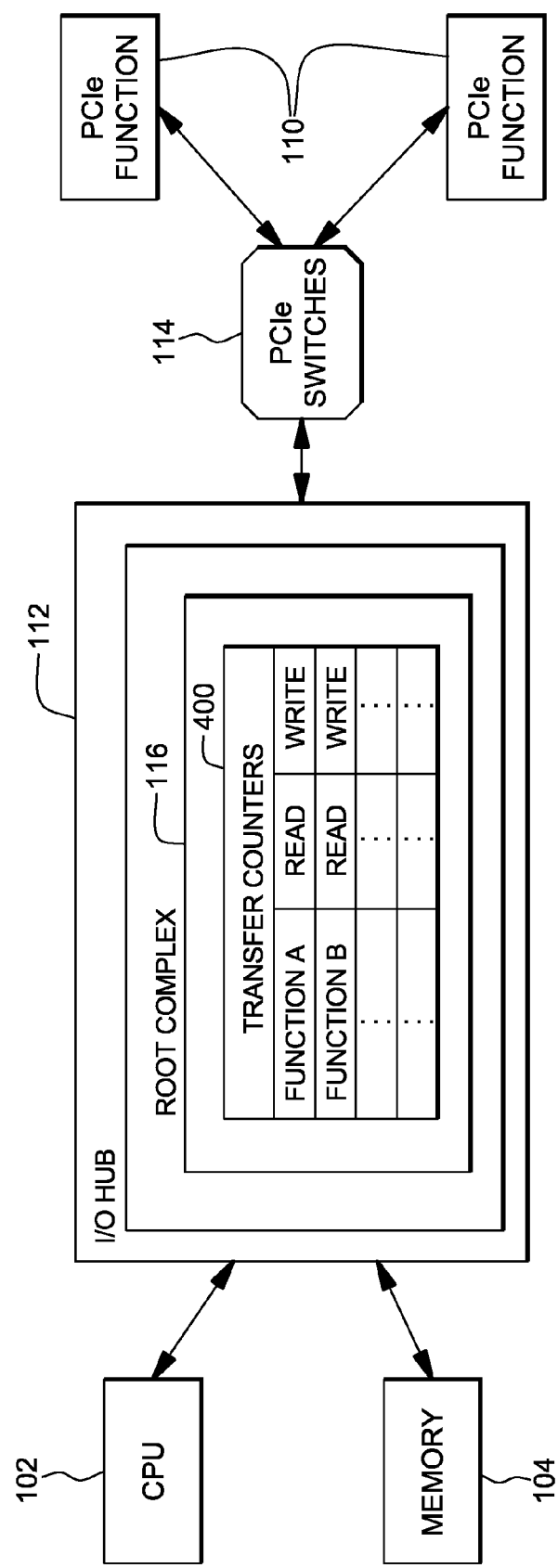
FIG. 4A depicts one embodiment of transfer counters used to track DMA reads and writes from the adapter functions, in accordance with an aspect of the present invention.

In addition to instruction tracking, in accordance with an aspect of the present invention, DMA operations are also tracked. In particular, data transfer amounts per function are tallied. Typically, DMA operations are not visible to the CPU using the previously-described instruction counting mechanisms, so an alternate technique is used. For instance, as shown in FIG. 4A, when a PCI function 110 issues a DMA write or read operation, it is received at I/O hub 112 via one or more switches 114. Responsive to receiving a PCI read or write packet at the I/O hub from a given PCI function, a data transfer counter 400 within the hub, and in particular, within root complex 116, is incremented according to the size of the data transfer. In one particular example, a unique set of read and write data transfer counters is maintained for each PCI function. These counters track, for instance, the number of bytes transferred. If, for instance, the DMA operation is a read operation, then the read counter is updated with the number of bytes read. Similarly, if the DMA operation is a write operation, then the write counter is updated with the number of bytes written. In one example, the counters are hardware counters (e.g., 32 bit counters on a 32 byte granularity).

Figure 4B:
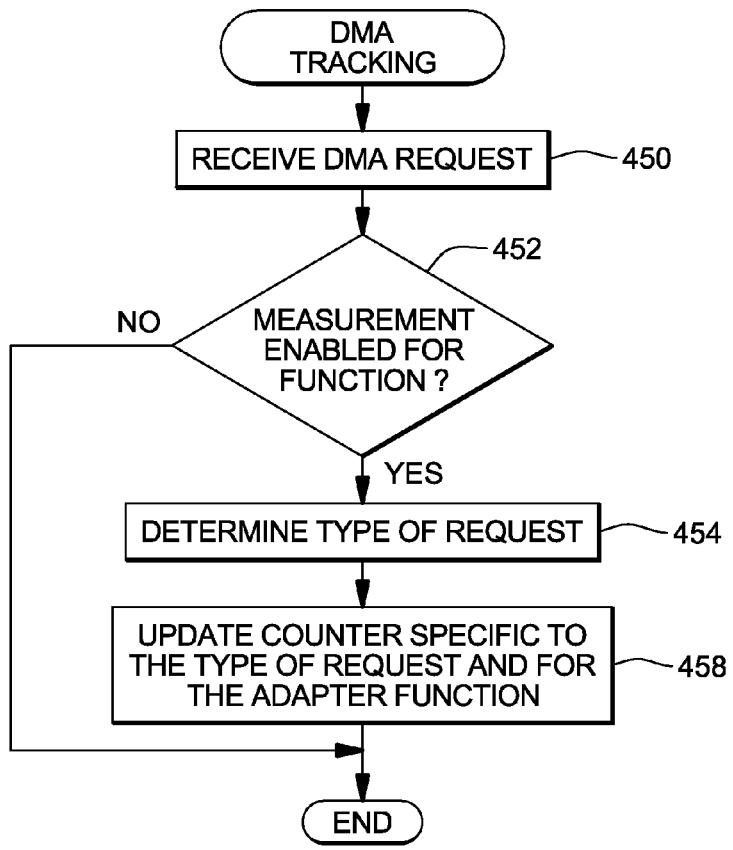
FIG. 4B depicts one embodiment of the logic to track DMA operations, in accordance with an aspect of the present invention.

Further details regarding the tracking of DMA operations are described with reference to FIG. 4B. In one example, it is the I/O hub performing this logic. As shown in FIG. 4B, initially, a DMA request is received at the I/O hub from a PCI function, STEP 450. A determination is made as to whether measurement is enabled for the PCI function, INQUIRY 452. That is, measurement is enabled for a specific adapter function. This determination is made by checking an indicator associated with the function. If the measurement enable indicator is not set, then tracking of the DMA operation is complete. However, if measurement is enabled for this specific PCI function, then a determination is made as to the type of request that is being processed, STEP 454. That is, is the request a read or a write request. In addition, other types of operation could be counted, such as Message Signaled Interruptions, or others.

Based on the type of request, a counter for that type and for this function is selected and updated, STEP 458. In one example, this occurs concurrent with the DMA processing. This completes the tracking of the DMA request.

In addition to the above, in accordance with an aspect of the present invention, there is a measurement control block in system memory for each PCI function, which is dynamically updated periodically (e.g., every four seconds). For instance, the firmware automatically updates one or more control blocks for one or more adapter functions with a periodic sampling of measurement values for the functions. For instance, the firmware periodically reads the counters from the I/O hub and adds them to the accumulated count in the measurement control block.

Figure 5:
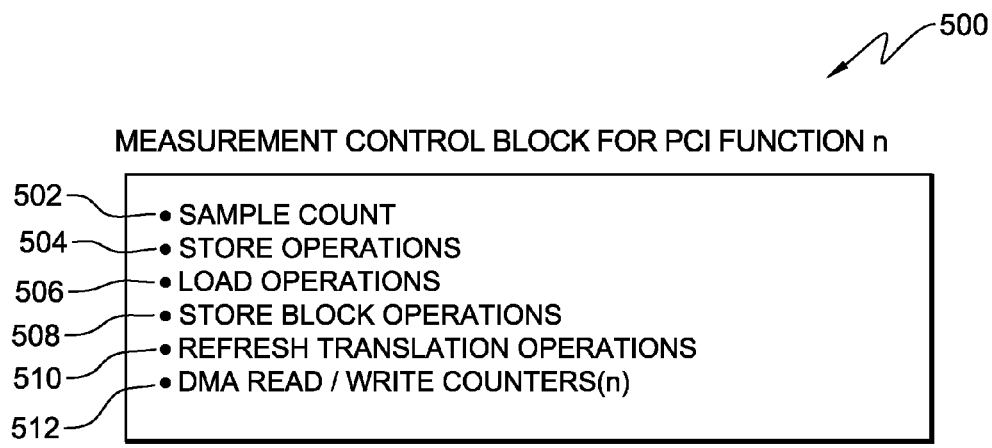
FIG. 5 depicts one embodiment of a measurement control block for an adapter function, in accordance with an aspect of the present invention.

One embodiment of a measurement control block 500 is depicted in FIG. 5. As shown, in this example, measurement control block 500 includes various parameters including, for instance:

Sample Count 502: This field is incremented each time the I/O subsystem updates the measurement control block;

Store Operations Field 504: This field is an updated value of the store instructions that have been executed for the PCI function associated with this control block. This field is updated by adding the value in store counter 312 to the value of this field.

The fields in this control block (excluding the sample count field) may be accumulated for a given period of time or reset after each sampling period so that the value reflects the counts for one sampling period. The accumulation period is defined based on policy and is reconfigurable;

Load Operations Field 506: This field includes a count of the load operations for this PCI function. This field is updated by adding the value in load counter 310 to the value of this field;

Store Block Operations Field 508: This field includes a count for the store block operations for this PCI function. This field is updated by adding the value in store block counter 314 to the value of this field;

Refresh Translation Operations Field 510: This field includes a count of the refresh translations instructions for this PCI function. This field is updated by adding the value in refresh translations counter 318 to the value of this field. The refresh translations instruction is used to update translation information used by the adapter; and DMA Read/Write Counter(s) 512: This field further includes updated information of the read and write counters for this PCI function. In this example, these counters are 64-bit counters. For instance, transfer counters 400 are retrieved periodically from the I/O hub and used to update the DMA read/write counters 512.

Again, each of the fields in the measurement block is dynamically updated at specified time intervals. The sample count field is incremented, and each of the other fields is updated by adding or replacing the value in the control block with its corresponding counter in secure memory.

In one particular example, a PCI function may have one or more address spaces defined for it, and therefore, the root complex would include a pair of read/write counters for each address space of the function. Similarly, the measurement block of that PCI function includes read/write pairs of counters for each of the address spaces.

To enable the measurement facility for a function, in one example, the operating system executes a measurement registration instruction referred to as a Modify PCI Function Controls instruction. Execution of this instruction is used to inform the I/O subsystem about the address in system memory for the measurement control block and also the key used to access that location. In one particular example, this instruction may also be tracked, and therefore, there would be a field in the measurement control block for this instruction, as well as a counter in secure memory (see, e.g., modify function counter 316).

Figure 6A:
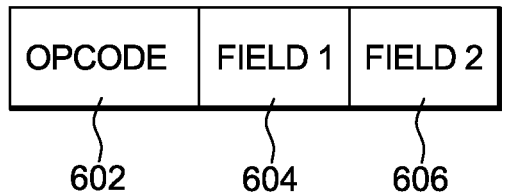
FIG. 6A depicts one embodiment of a Modify PCI Function Controls instruction used in accordance with an aspect of the present invention.

Further details regarding the Modify PCI Function Controls instruction are described herein. Referring to FIG. 6A, a Modify PCI Function Controls instruction 600 includes, for instance, an op code 602 indicating the Modify PCI Function Controls instruction; a first field 604 specifying a location at which various information is included regarding the adapter function for which the operational parameters are being established; and a second field 606 specifying a location from which a PCI function information block (FIB) is fetched. The contents of the locations designated by Fields 1 and 2 are further described below.

Figure 6B:
FIG. 6B depicts one embodiment of a field used by the Modify PCI Function Controls instruction of FIG. 6A, in accordance with an aspect of the present invention.

In one embodiment, Field 1 designates a general register that includes various information. As shown in FIG. 6B, the contents of the register include, for instance, a function handle 610 that identifies the handle of the adapter function on behalf of which the modify instruction is being performed; an address space 612 designating an address space in system memory associated with the adapter function designated by the function handle; an operation control 614 which specifies the operation to be performed for the adapter function; and status 616 which provides status regarding the instruction when the instruction completes with a predefined code.

In one embodiment, the function handle includes, for instance, an enable indicator indicating whether the handle is enabled, a function number that identifies an adapter function (this is a static identifier and may be used to index into a function table); and an instance number specifying the particular instance of this function handle. There is one function handle for each adapter function, and it is used to locate a function table entry (FTE) within the function table. Each function table entry includes operational parameters and/or other information associated with its adapter function. As one example, a function table entry includes:

Instance Number: This field indicates a particular instance of the adapter function handle associated with the function table entry;

Device Table Entry (DTE) Index 1 . . . n: There may be one or more device table indices, and each index is an index into a device table to locate a device table entry (DTE). There are one or more device table entries per adapter function, and each entry includes information associated with its adapter function, including information used to process requests of the adapter function (e.g., DMA requests, MSI requests) and information relating to requests associated with the adapter function (e.g., PCI instructions). Each device table entry is associated with one address space within system memory assigned to the adapter function. An adapter function may have one or more address spaces within system memory assigned to the adapter function.

Busy Indicator: This field indicates whether the adapter function is busy;

Permanent Error State Indicator: This field indicates whether the adapter function is in a permanent error state;

Recovery Initiated Indicator: This field indicates whether recovery has been initiated for the adapter function;

Permission Indicator: This field indicates whether the operating system trying to control the adapter function has authority to do so;

Enable Indicator: This field indicates whether the adapter function is enabled (e.g., 1=enabled, 0=disabled);

Requestor Identifier (RID): This is an identifier of the adapter function, and includes, for instance, a bus number, a device number and a function number.

In one example, this field is used for accesses of a configuration space of the adapter function. (Memory of an adapter may be defined as address spaces, including, for instance, a configuration space, an I/O space, and/or one or more memory spaces.) In one example, the configuration space may be accessed by specifying the configuration space in an instruction issued by the operating system (or other configuration) to the adapter function. Specified in the instruction is an offset into the configuration space and a function handle used to locate the appropriate function table entry that includes the RID. The firmware receives the instruction and determines it is for a configuration space. Therefore, it uses the RID to generate a request to the I/O hub, and the I/O hub creates a request to access the adapter. The location of the adapter function is based on the RID, and the offset specifies an offset into the configuration space of the adapter function.

Base Address Register (BAR) (1 to n): This field includes a plurality of unsigned integers, designated as $BAR_0$-$BAR_n$, which are associated with the originally specified adapter function, and whose values are also stored in the base address registers associated with the adapter function. Each BAR specifies the starting address of a memory space or I/O space within the adapter function, and also indicates the type of address space, that is whether it is a 64 or 32 bit memory space, or a 32 bit I/O space, as examples;

In one example, it is used for accesses to memory space and/or I/O space of the adapter function. For instance, an offset provided in an instruction to access the adapter function is added to the value in the base address register associated with the address space designated in the instruction to obtain the address to be used to access the adapter function. The address space identifier provided in the instruction identifies the address space within the adapter function to be accessed and the corresponding BAR to be used;

Size 1 . . . n: This field includes a plurality of unsigned integers, designated as $SIZE_0$-$SIZE_n$. The value of a Size field, when non-zero, represents the size of each address space with each entry corresponding to a previously described BAR.

Further details regarding BAR and Size are described below.
1. When a BAR is not implemented for an adapter function, the BAR field and its corresponding size field are both stored as zeros.
2. When a BAR field represents either an I/O address space or a 32-bit memory address space, the corresponding size field is non-zero and represents the size of the address space.
3. When a BAR field represents a 64-bit memory address space,
   a. The $BAR_n$ field represents the least significant address bits.
   b. The next consecutive $BAR_{n+1}$ field represents the most significant address bits.
   c. The corresponding $SIZE_n$ field is non-zero and represents the size of the address space.
   d. The corresponding $SIZE_{n+1}$ field is not meaningful and is stored as zero.

Internal Routing Information: This information is used to perform particular routing to the adapter. It includes, for instance, node, processor chip, and hub addressing information, as examples.

Status Indication: This provides an indication of, for instance, whether load/store operations are blocked or the adapter is in the error state, as well as other indications.

In one example, the busy indicator, permanent error state indicator, and recovery initiated indicator are set based on monitoring performed by the firmware. Further, the permission indicator is set, for instance, based on policy; and the BAR information is based on configuration information discovered during a bus walk by the processor (e.g., firmware of the processor). Other fields may be set based on configuration, initialization, and/or events. In other embodiments, the function table entry may include more, less or different information. The information included may depend on the operations supported by or enabled for the adapter function.

Figure 6C:
FIG. 6C depicts one embodiment of another field used by the Modify PCI Function Controls instruction of FIG. 6A, in accordance with an aspect of the present invention.

Referring to FIG. 6C, in one example, Field 2 designates a logical address 620 of a PCI function information block (FIB), which includes information regarding an associated adapter function. The function information block is used to update a device table entry and/or function table entry (or other location) associated with the adapter function. The information is stored in the FIB during initialization and/or configuration of the adapter, and/or responsive to particular events.

Figure 6D:
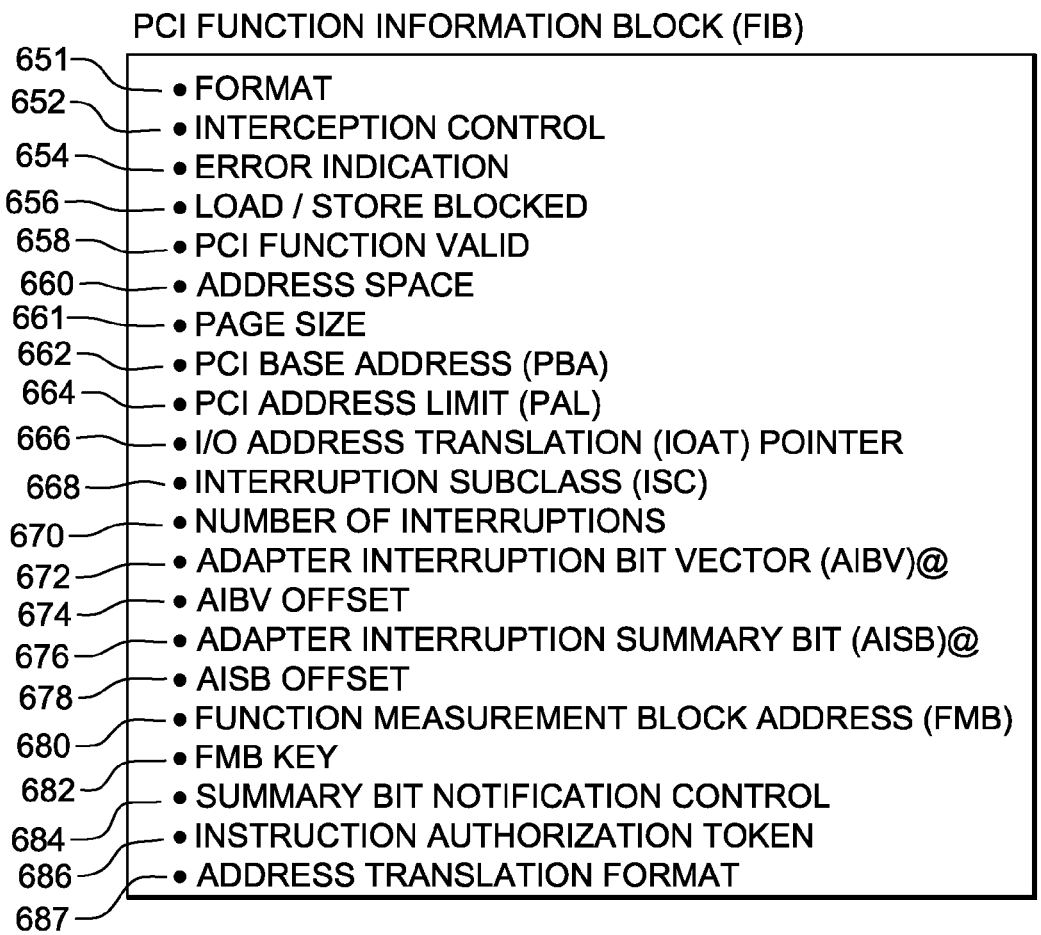
FIG. 6D depicts one embodiment of the contents of a function information block (FIB) used in accordance with an aspect of the present invention.

Further details regarding a function information block (FIB) are described with reference to FIG. 6D. In one embodiment, a function information block 650 includes the following fields:

Format 651: This field specifies the format of the FIB.

Interception Control 652: This field is used to indicate whether guest execution of specific instructions by a pageable mode guest results in instruction interception;

Error Indication 654: This field includes the error state indication for direct memory access and adapter interruptions. When the bit is set (e.g., 1), one or more errors have been detected while performing direct memory access or adapter interruption for the adapter function;

Load/Store Blocked 656: This field indicates whether load/store operations are blocked;

PCI Function Valid 658: This field includes an enablement control for the adapter function. When the bit is set (e.g., 1), the adapter function is considered to be enabled for I/O operations;

Address Space Registered 660: This field includes a direct memory access enablement control for an adapter function. When the field is set (e.g., 1) direct memory access is enabled;

Page Size 661: This field indicates the size of the page or other unit of memory to be accessed by a DMA memory access;

PCI Base Address (PBA) 662: This field is a base address for an address space in system memory assigned to the adapter function. It represents the lowest virtual address that an adapter function is allowed to use for direct memory access to the specified DMA address space;

PCI Address Limit (PAL) 664: This field represents the highest virtual address that an adapter function is allowed to access within the specified DMA address space;

Input/Output Address Translation Pointer (IOAT) 666: The input/output address translation pointer designates the first of any translation tables used by a PCI virtual address translation, or it may directly designate the absolute address of a frame of storage that is the result of translation;

Interruption Subclass (ISC) 668: This field includes the interruption subclass used to present adapter interruptions for the adapter function;

Number of Interruptions (NOI) 670: This field designates the number of distinct interruption codes accepted for an adapter function. This field also defines the size, in bits, of the adapter interruption bit vector designated by an adapter interruption bit vector address and adapter interruption bit vector offset fields;

Adapter Interruption Bit Vector Address (AIBV) 672: This field specifies an address of the adapter interruption bit vector for the adapter function. This vector is used in interrupt processing;

Adapter Interruption Bit Vector Offset 674: This field specifies the offset of the first adapter interruption bit vector bit for the adapter function;

Adapter Interruption Summary Bit Address (AISB) 676: This field provides an address designating the adapter interruption summary bit, which is optionally used in interrupt processing;

Adapter Interruption Summary Bit Offset 678: This field provides the offset into the adapter interruption summary bit vector;

Function Measurement Block (FMB) Address 680: This field provides an address of a function measurement block used to collect measurements regarding the adapter function;

Function Measurement Block Key 682: This field includes an access key to access the function measurement block;

Summary Bit Notification Control 684: This field indicates whether there is a summary bit vector being used;

Instruction Authorization Token 686: This field is used to determine whether a pageable storage mode guest is authorized to execute PCI instructions without host intervention.

In one example, in the z/Architecture®, a pageable guest is interpretively executed via the Start Interpretive Execution (SIE) instruction, at level 2 of interpretation. For instance, the logical partition (LPAR) hypervisor executes the SIE instruction to begin the logical partition in physical, fixed memory. If z/VM® is the operating system in that logical partition, it issues the SIE instruction to execute its guests (virtual) machines in its V=V (virtual) storage. Therefore, the LPAR hypervisor uses level-1 SIE, and the z/VM® hypervisor uses level-2 SIE; and Address Translation Format 687: This field indicates a selected format for address translation of the highest level translation table to be used in translation (e.g., an indication of highest level table (e.g. segment table, region 3rd, etc.) and an indication of the selected format (e.g., CPU DAT compatible, I/O extended address translation format, a bypass format, a no fetch format). It may also indicate a format.

The function information block designated in the Modify PCI Function Controls instruction is used to modify a selected device table entry, a function table entry and/or other firmware controls associated with the adapter function designated in the instruction. By modifying the device table entry, function table entry and/or other firmware controls, certain services are provided for the adapter. These services include, for instance, adapter interruptions; address translations; reset error state; reset load/store blocked; set function measurement parameters; and set interception control.

One embodiment of the logic associated with the Modify PCI Function Controls instruction is described with reference to FIG. 7. In one example, the instruction is issued by an operating system (or other configuration) and executed by the processor (e.g., firmware) executing the operating system. In the examples herein, the instruction and adapter functions are PCI based. However, in other examples, a different adapter architecture and corresponding instructions may be used.

In one example, the operating system provides the following operands to the instruction (e.g., in one or more registers designated by the instruction): the PCI function handle; the DMA address space identifier; an operation control; and an address of the function information block.

Figure 7:
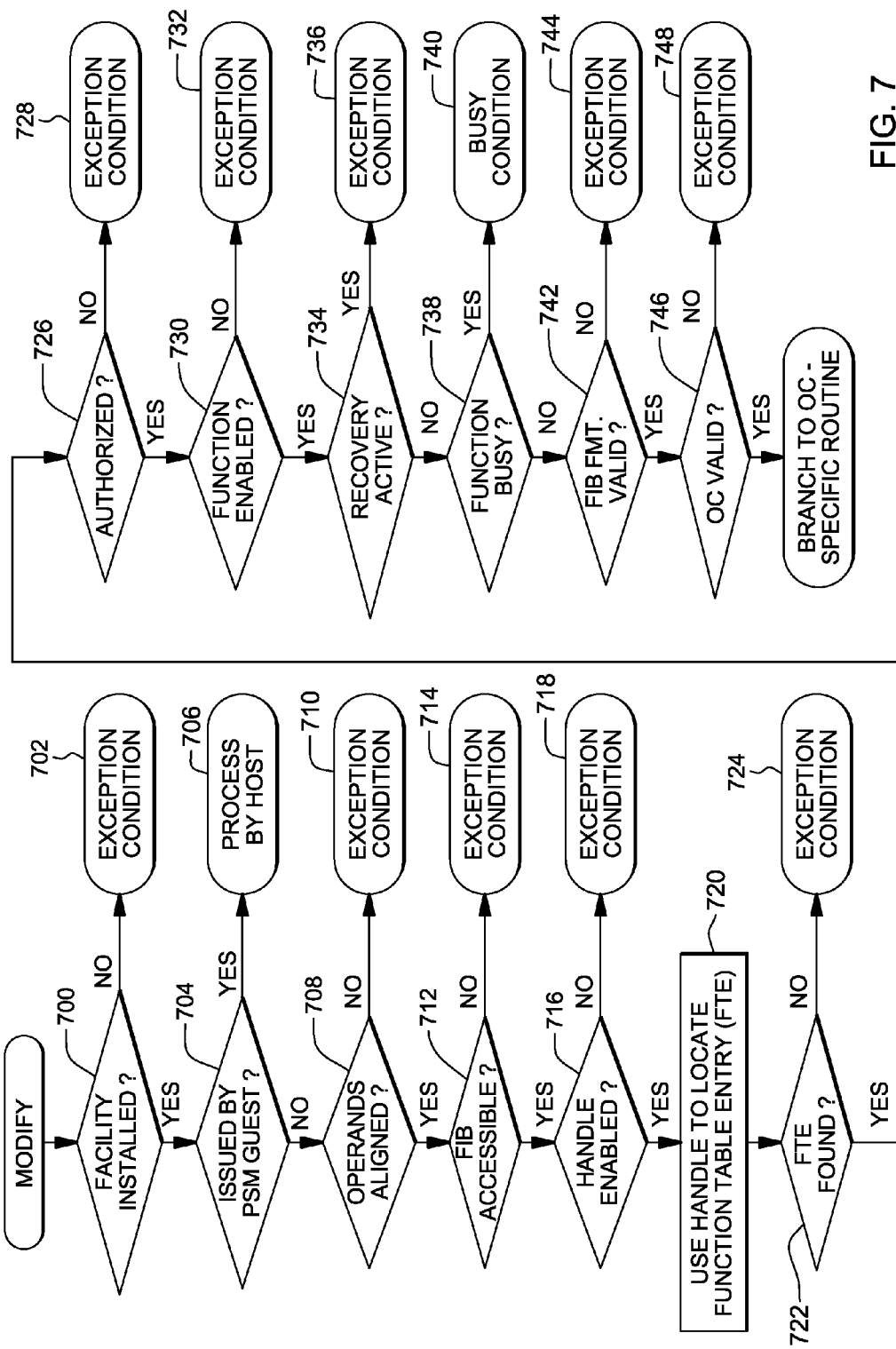
FIG. 7 depicts one embodiment of an overview of the logic of the Modify PCI Function Controls instruction, in accordance with an aspect of the present invention.

Referring to FIG. 7, initially, a determination is made as to whether the facility allowing for a Modify PCI Function Controls instruction is installed, INQUIRY 700. This determination is made by, for instance, checking an indicator stored in, for instance, a control block. If the facility is not installed, an exception condition is provided, STEP 702. Otherwise, a determination is made as to whether the instruction was issued by a pageable storage mode guest (or other guest), INQUIRY 704. If yes, the host operating system will emulate the operation for that guest, STEP 706.

Otherwise, a determination is made as to whether one or more of the operands are aligned, INQUIRY 708. For instance, a determination is made as to whether the address of the function information block is on a double word boundary. In one example, this is optional. If the operands are not aligned, then an exception condition is provided, STEP 710. Otherwise, a determination is made as to whether the function information block is accessible, INQUIRY 712. If not, then an exception condition is provided, STEP 714. Otherwise, a determination is made as to whether the handle provided in the operands of the Modify PCI Function Controls instruction is enabled, INQUIRY 716. In one example, this determination is made by checking an enable indicator in the handle. If the handle is not enabled, then an exception condition is provided, STEP 718.

If the handle is enabled, then the handle is used to locate a function table entry, STEP 720. That is, at least a portion of the handle is used as an index into the function table to locate the function table entry corresponding to the adapter function for which operational parameters are to be established.

A determination is made as to whether the function table entry was found, INQUIRY 722. If not, then an exception condition is provided, STEP 724. Otherwise, if the configuration issuing the instruction is a guest, INQUIRY 726, then an exception condition (e.g., interception to the host) is provided, STEP 728. This inquiry may be ignored if the configuration is not a guest or other authorizations may be checked, if designated.

A determination is then made as to whether the function is enabled, INQUIRY 730. In one example, this determination is made by checking an enable indicator in the function table entry. If it is not enabled, then an exception condition is provided, STEP 732.

If the function is enabled, then a determination is made as to whether recovery is active, INQUIRY 734. If recovery is active as determined by a recovery indicator in the function table entry, then an exception condition is provided, STEP 736. However, if recovery is not active, then a further determination is made as to whether the function is busy, INQUIRY 738. This determination is made by checking the busy indicator in the function table entry. If the function is busy, then a busy condition is provided, STEP 740. With the busy condition, the instruction can be retried, instead of dropped.

If the function is not busy, then a further determination is made as to whether the function information block format is valid, INQUIRY 742. For instance, the format field of the FIB is checked to determine if this format is supported by the system. If it is invalid, then an exception condition is provided, STEP 744. If the function information block format is valid, then a further determination is made as to whether the operation control specified in the operands of the instruction is valid, INQUIRY 746. That is, is the operation control one of the specified operation controls for this instruction. If it is invalid, then an exception condition is provided, STEP 748. However, if the operation control is valid, then processing continues with the specific operation control being specified.

One operation that may be specified by the operation control is a set PCI function measurement parameters operation used for maintaining measurements. With this operation, the PCI function parameters relevant to PCI function measurement are set from the function information block. If the function measurement block address field contains a non-zero address, then PCI function measurement is enabled. However, if the function measurement block address field contains zeros, then PCI function measurement is disabled. In one example, the operands for this operation obtained from the function information block include the function measurement block address and function measurement block key. Implied operands include the number of DMA address spaces, which is obtained from the function table entry.

Figure 8:
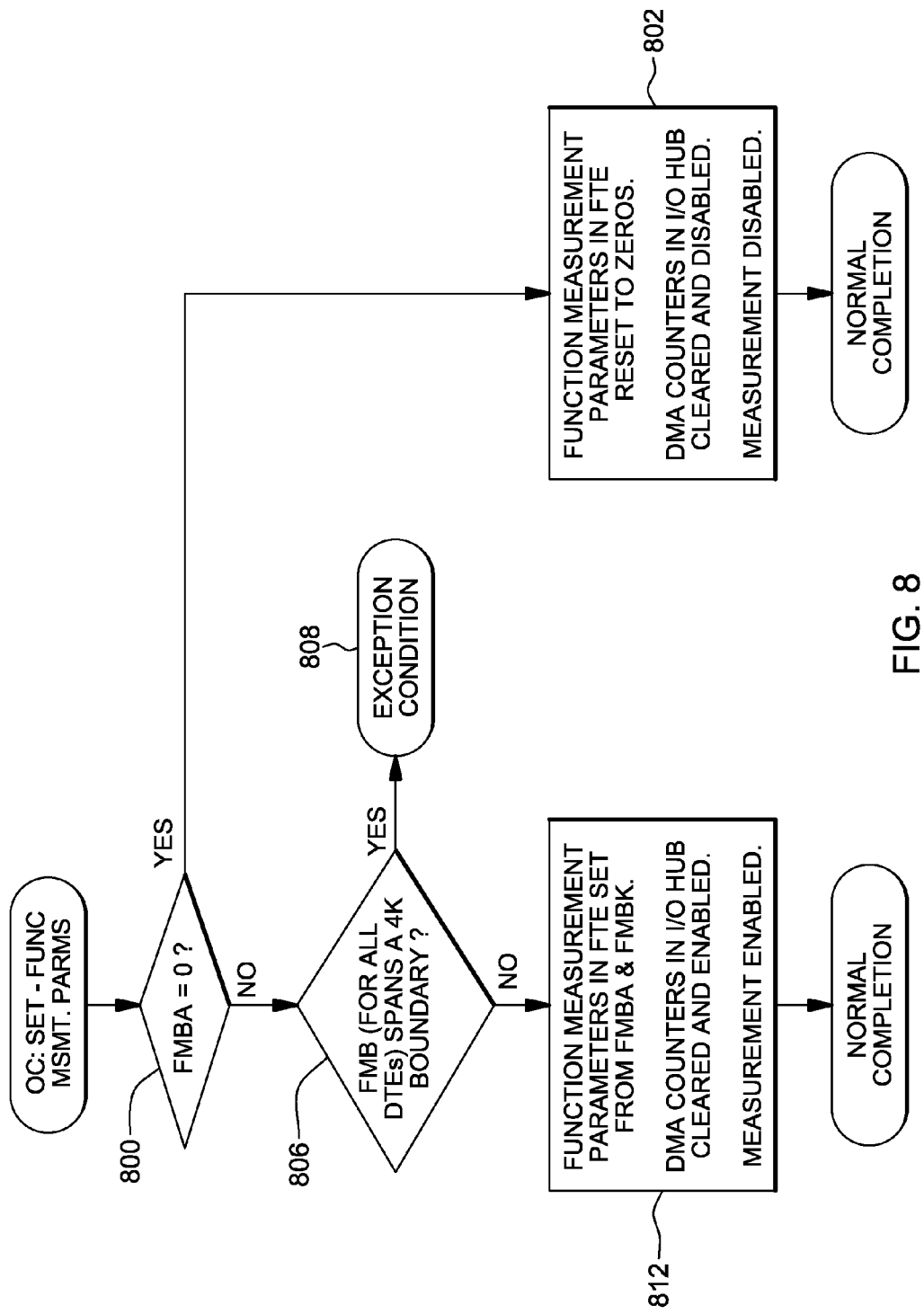
FIG. 8 depicts one embodiment of the logic of a set PCI functions measurement parameters operation that may be specified by the Modify PCI Function Controls instruction, in accordance with an aspect of the present invention.

One embodiment of the logic associated with this operation is described with reference to FIG. 8. In one example, a determination is made as to whether the function measurement block address is equal to zero, INQUIRY 800. If so, then the function measurement parameters in the function table entry are reset to zero, STEP 802. Further, the DMA counters in the I/O hub are cleared and disabled, and measurement is disabled.

Returning to INQUIRY 800, if the function measurement block address is not zero, then a further determination is made as to whether the function measurement block for all device table entries spans a 4 k boundary, INQUIRY 806. In one example, 4 k block spanning is determined by adding the function measurement block address, fixed function measurement block size plus DMA address space specific extensions for each DMA address space. If the function measurement block spans a 4K boundary, then an exception condition is provided, STEP 808. Otherwise, the function measurement parameters in the function table entry (e.g., FMBA and FMBK) are set from the function measurement block address and function measurement block key parameters of the function information block, STEP 812. Further, the DMA counters in the I/O hub are cleared and enabled, and measurement is enabled.

Additionally, further details regarding PCI Load, PCI Store and PCI Store Block are provided.

Figure 9A:
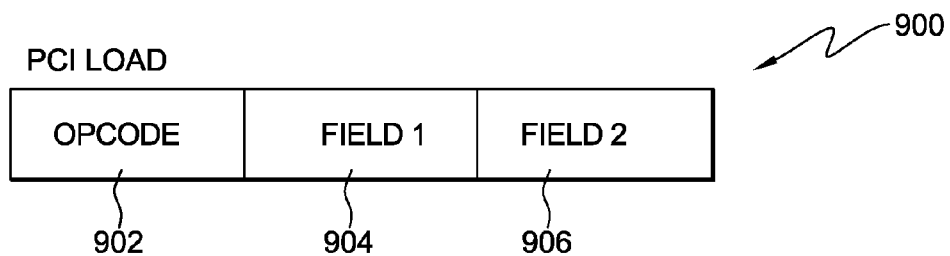
FIG. 9A depicts one embodiment of a PCI Load instruction used in accordance with an aspect of the present invention.

Referring initially to FIG. 9A, one embodiment of a PCI Load instruction is depicted. As shown, a PCI Load instruction 900 includes, for instance, an opcode 902 indicating the PCI Load instruction; a first field 904 specifying a location at which data fetched from an adapter function will be loaded; and a second field 906 specifying a location at which various information is included regarding the adapter function from which data is to be loaded. The contents of the locations designated by Fields 1 and 2 are further described below.

Figure 9B:
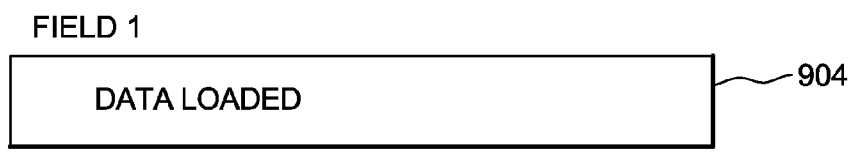
FIG. 9B depicts one embodiment of a field used by the PCI Load instruction of FIG. 9A, in accordance with an aspect of the present invention.
Figure 9C:
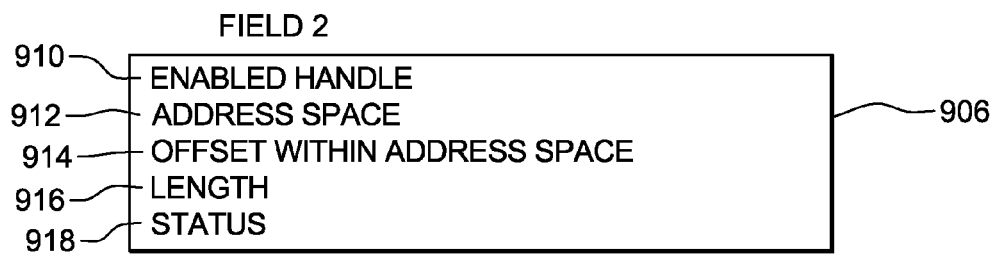
FIG. 9C depicts one embodiment of another field used by the PCI Load instruction of FIG. 9A, in accordance with an aspect of the present invention.

In one example, Field 1 designates a general register, and as depicted in FIG. 9B, the contents 904 of that register include a contiguous range of one or more bytes loaded from the location of the adapter function specified in the instruction. In one example, the data is loaded into the rightmost byte positions of the register.

In one embodiment, Field 2 designates a pair of general registers that include various information. As shown in FIG. 9B, the contents of the registers include, for instance:

Enabled Handle 910: This field is an enabled function handle of the adapter function from which the data is to be loaded;
  Address Space 912: This field identifies the address space within the adapter function from which the data is to be loaded;
  Offset Within Address Space 914: This field specifies the offset within the specified address space from which the data is to be loaded;
  Length field 916: This field specifies the length of the load operation (e.g., the number of bytes to be loaded); and
  Status field 918: This field provides a status code which is applicable when the instruction completes with a predefined condition code.

In one embodiment, the bytes loaded from the adapter function are to be contained within an integral boundary in the adapter function's designated PCI address space. When the address space field designates a memory address space, the integral boundary size is, for instance, a double word. When the address space field designates an I/O address space or a configuration address space, the integral boundary size is, for instance, a word.

One embodiment of the logic associated with a PCI Load instruction is described with reference to FIGS. 10A-10B. In one example, the instruction is issued by an operating system (or other configuration) and executed by the processor (e.g., firmware) executing the operating system. In the examples herein, the instructions and adapter functions are PCI-based. However, in other examples, a different adapter architecture and corresponding instructions may be used.

To issue the instruction, the operating system provides the following operands to the instruction (e.g., in one or more registers designated by the instruction): the PCI function handle, the PCI address space (PCIAS), the offset into the PCI address space, and the length of the data to be loaded. Upon successful completion of the PCI Load instruction, the data is loaded in the location (e.g., register) designated by the instruction.

Figure 10A:
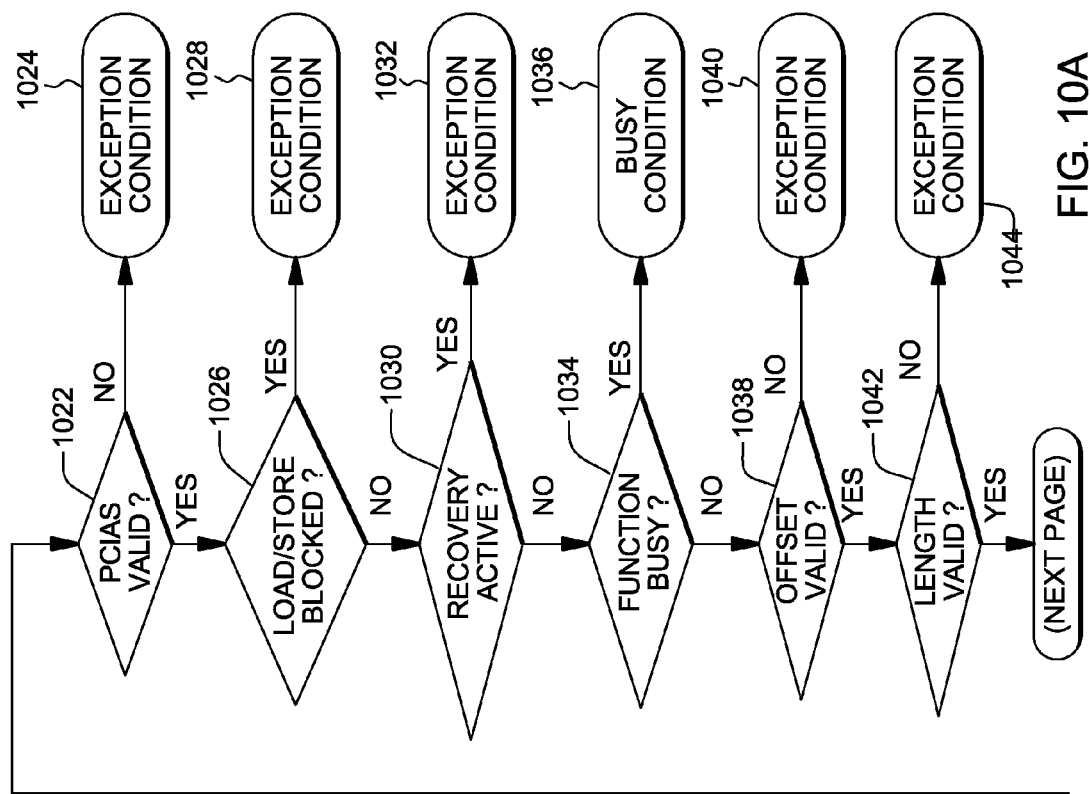
FIGS. 10A-10B depict one embodiment of the logic to perform a PCI Load operation, in accordance with an aspect of the present invention.
Figure 10A:
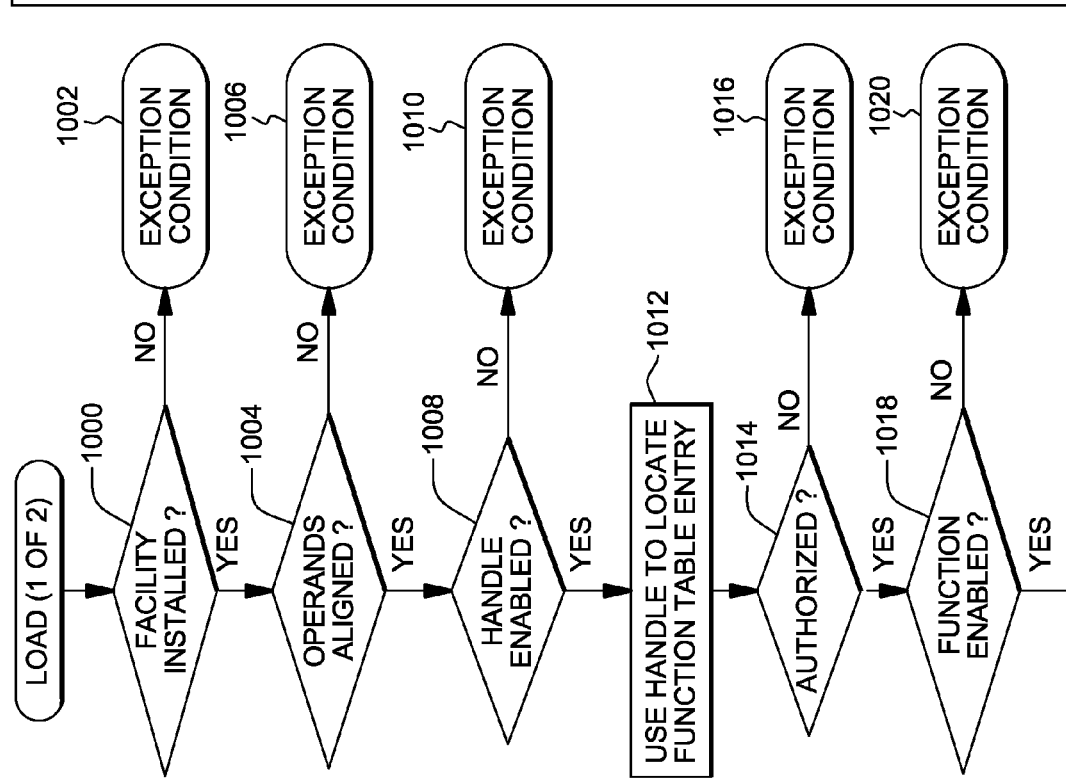

Referring to FIG. 10A, initially, a determination is made as to whether the facility allowing for a PCI Load instruction is installed, INQUIRY 1000. This determination is made by, for instance, checking an indicator stored in, for instance, a control block. If the facility is not installed, an exception condition is provided, STEP 1002. Otherwise, a determination is made as to whether the operands are aligned, INQUIRY 1004. For instance, if certain operands need to be in even/odd register pairs, a determination is made as to whether those requirements are met. If the operands are not aligned, then an exception is provided, STEP 1006. Otherwise, if the facility is installed and the operands are aligned, a determination is made as to whether the handle provided in the operands of the PCI Load instruction is enabled, INQUIRY 1008. In one example, this determination is made by checking an enable indicator in the handle. If the handle is not enabled, then an exception condition is provided, STEP 1010.

If the handle is enabled, then the handle is used to locate a function table entry, STEP 1012. That is, at least a portion of the handle is used as an index into the function table to locate the function table entry corresponding to the adapter function from which data is to be loaded.

Thereafter, if the configuration issuing the instruction is a guest, a determination is made as to whether the function is configured for use by a guest, INQUIRY 1014. If it is not authorized, then an exception condition is provided, STEP 1016. This inquiry may be ignored if the configuration is not a guest or other authorizations may be checked, if designated.

A determination is then made as to whether the function is enabled, INQUIRY 1018. In one example, this determination is made by checking an enable indicator in the function table entry. If it is not enabled, then an exception condition is provided, STEP 1020.

If the function is enabled, then a determination is made as to whether the address space is valid, INQUIRY 1022. For instance, is the specified address space a designated address space of the adapter function and one that is appropriate for this instruction. If the address space is invalid, then an exception condition is provided, STEP 1024. Otherwise, a determination is made as to whether load/store is blocked, INQUIRY 1026. In one example, this determination is made by checking the status indicator in the function table entry. If load/store is blocked, then an exception condition is provided, STEP 1028.

However, if load/store is not blocked, a determination is made as to whether recovery is active, INQUIRY 1030. In one example, this determination is made by checking the recovery initiated indicator in the function table entry. If recovery is active, then an exception condition is provided, STEP 1032. Otherwise, a determination is made as to whether the function is busy, INQUIRY 1034. This determination is made by checking the busy indicator in the function table entry. If the function is busy, then a busy condition is provided, STEP 1036. With a busy condition, the instruction can be retried, instead of dropped.

If the function is not busy, then a further determination is made as to whether the offset specified in the instruction is valid, INQUIRY 1038. That is, is the offset in combination with the length of the operation within the base and length of the address space, as specified in the function table entry. If not, then an exception condition is provided, STEP 1040. However, if the offset is valid, then a determination is made as to whether the length is valid, INQUIRY 1042. That is, subject to the address space type, offset within the address space, and an integral boundary size is the length valid. If not, then an exception condition is provided, STEP 1044. Otherwise, processing continues with the load instruction. (In one embodiment, the firmware performs the above checks.)

Figure 10B:
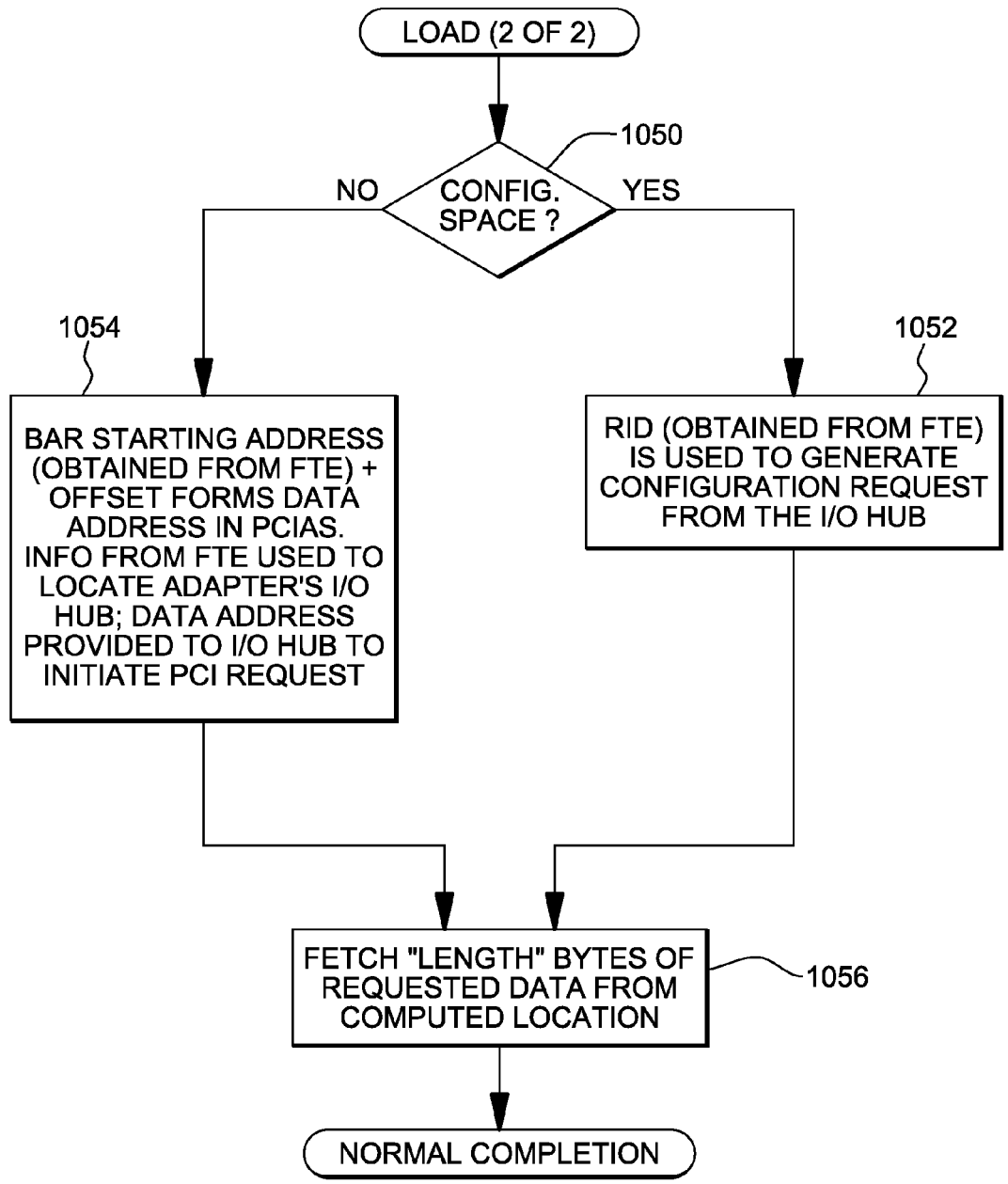

Continuing with FIG. 10B, a determination is made by the firmware as to whether the load is for a configuration address space of the adapter function, INQUIRY 1050. That is, based on the configuration of the adapter function's memory, is the specified address space provided in the instruction a configuration space. If so, then the firmware performs various processing to provide the request to a hub coupled to the adapter function; the hub then routes the request to the function, STEP 1052.

For example, the firmware obtains the requestor ID from the function table entry pointed to by the function handle provided in the instruction operands. Further, the firmware determines based on information in the function table entry (e.g., the internal routing information) the hub to receive this request. That is, an environment may have one or more hubs and the firmware determines the hub coupled to the adapter function. It then forwards the request to the hub. The hub generates a configuration read request packet that flows out on the PCI bus to the adapter function identified by the RID in the function table entry. The configuration read request includes the RID and offset (i.e., data address) that are used to fetch the data, as described below.

Returning to INQUIRY 1050, if the designated address space is not a configuration space, then once again the firmware performs various processing to provide the request to the hub, STEP 1054. The firmware uses the handle to select a function table entry and from that entry it obtains information to locate the appropriate hub. It also calculates a data address to be used in the load operation. This address is calculated by adding the BAR starting address (with the BAR being that associated with the address space identifier provided in the instruction) obtained from the function table entry to the offset provided in the instruction. This calculated data address is provided to the hub. The hub then takes that address and includes it in a request packet, such as a DMA read request packet, that flows out over the PCI bus to the adapter function.

Responsive to receiving the request either via STEP 1052 or STEP 1054, the adapter function fetches the requested data from the specified location (i.e., at the data address) and returns that data in a response to the request, STEP 1056. The response is forwarded from the adapter function to the I/O hub. Responsive to receiving the response, the hub forwards the response to the initiating processor. The initiating processor then takes the data from the response packet and loads it in the designated location specified in the instruction (e.g., field 1). The PCI Load operation concludes with an indication of success (e.g., setting a condition code of zero).

Figure 11A:
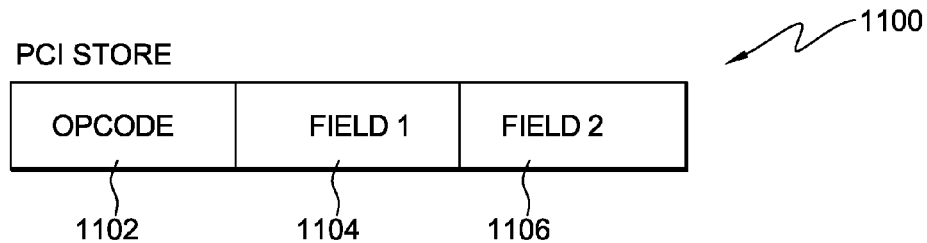
FIG. 11A depicts one embodiment of a PCI Store instruction used in accordance with an aspect of the present invention.

In addition to a load instruction that retrieves data from an adapter function and stores it in a designated location, another instruction that may be executed is a store instruction. The store instruction stores data at a specified location in the adapter function. One embodiment of a PCI Store instruction is described with reference to FIG. 11A. As shown, a PCI Store instruction 1100 includes, for instance, an opcode 1102 indicating the PCI Store instruction; a first field 1104 specifying a location that includes data to be stored in an adapter function; and a second field 1106 specifying a location at which various information is included regarding the adapter function to which data is to be stored. The contents of the locations designated by Fields 1 and 2 are further described below.

Figure 11B:
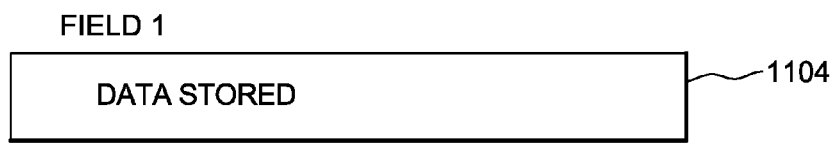
FIG. 11B depicts one embodiment of a field used by the PCI Store instruction of FIG. 11A, in accordance with an aspect of the present invention.

In one example, Field 1 designates a general register, and as depicted in FIG. 11B, the contents 1104 of that register include a contiguous range of one or more bytes of data to be stored into the specified location of an adapter function. In one example, the data in the rightmost byte positions of the register are stored.

Figure 11C:
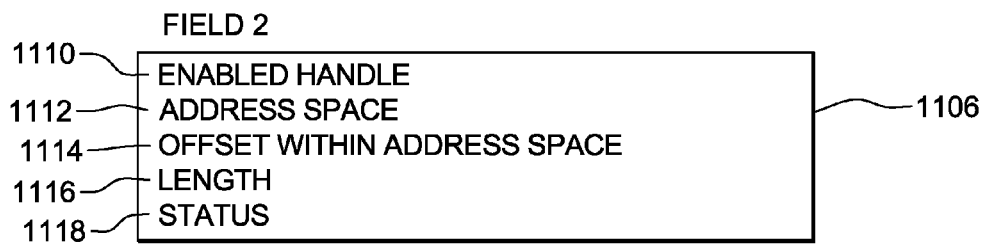
FIG. 11C depicts one embodiment of another field used by the PCI Store instruction of FIG. 11A, in accordance with an aspect of the present invention.

In one embodiment, Field 2 designates a pair of general registers that include various information. As shown in FIG. 11C, the contents of the register include, for instance:

Enabled Handle 1110: This field is an enabled function handle of the adapter function to which the data is to be stored;

Address Space 1112: This field identifies the address space within the adapter function to which the data is to be stored;

Offset Within Address Space 1114: This field specifies the offset within the specified address space to which the data is to be stored;

Length field 1116: This field specifies the length of the store operation (e.g., the number of bytes to be stored); and Status field 1118: This field provides a status code which is applicable when the instruction completes with a pre-defined condition code.

On embodiment of the logic associated with a PCI Store instruction is described with reference to FIGS. 12A-12B. In one example, the instruction is issued by an operating system, and executed by the processor (e.g., firmware) executing the operating system.

To issue the instruction, the operating system provides the following operands to the instruction (e.g., in one or more registers designated by the instruction): the PCI function handle, the PCI address space (PCIAS), the offset into the PCI address space, the length of the data to be stored, and a pointer to the data to be stored. Upon successful completion of the PCI Store instruction, the data is stored in the location designated by the instruction.

Figure 12A:
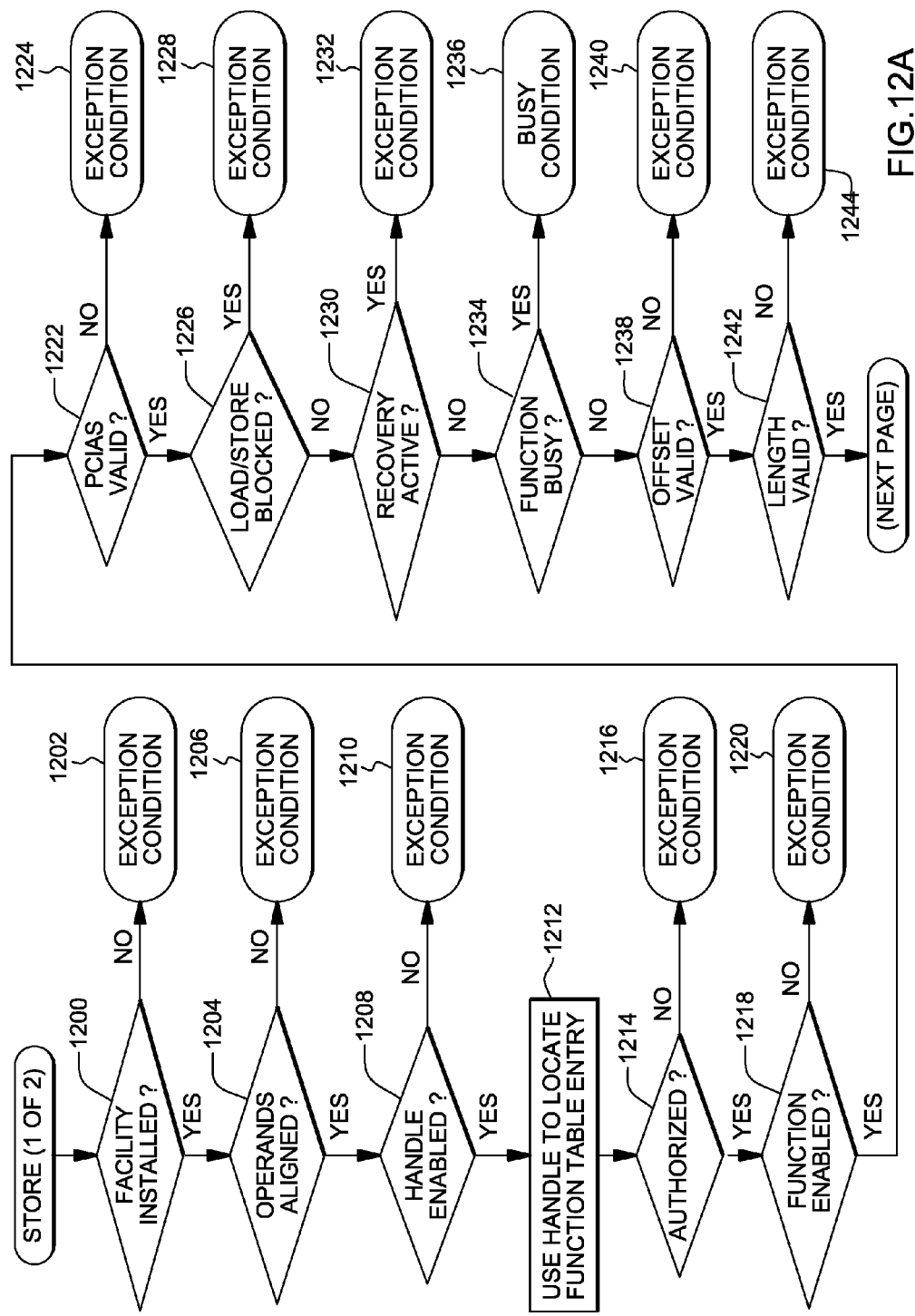
FIGS. 12A-12B depict one embodiment of the logic to perform a PCI Store operation, in accordance with an aspect of the present invention.

Referring to FIG. 12A, initially, a determination is made as to whether the facility allowing for a PCI Store instruction is installed, INQUIRY 1200. This determination is made by, for instance, checking an indicator stored in, for instance, a control block. If the facility is not installed, an exception condition is provided, STEP 1202. Otherwise, a determination is made as to whether the operands are aligned, INQUIRY 1204. For instance, if certain operands need to be in even/odd register pairs, a determination is made as to whether those requirements are met. If the operands are not aligned, then an exception is provided, STEP 1206. Otherwise, if the facility is installed and the operands are aligned, a determination is made as to whether the handle provided in the operands of the PCI Store instruction is enabled, INQUIRY 1208. In one example, this determination is made by checking an enable indicator in the handle. If the handle is not enabled, then an exception condition is provided, STEP 1210.

If the handle is enabled, then the handle is used to locate a function table entry, STEP 1212. That is, at least a portion of the handle is used as an index into the function table to locate the function table entry corresponding to the adapter function at which data is to be stored.

Thereafter, if the configuration issuing the instruction is a guest, a determination is made as to whether the function is configured for use by a guest, INQUIRY 1214. If it is not authorized, then an exception condition is provided, STEP 1216. This inquiry may be ignored if the configuration is not a guest or other authorizations may be checked, if designated.

A determination is then made as to whether the function is enabled, INQUIRY 1218. In one example, this determination is made by checking an enable indicator in the function table entry. If it is not enabled, then an exception condition is provided, STEP 1220.

If the function is enabled, then a determination is made as to whether the address space is valid, INQUIRY 1222. For instance, is the specified address space a designated address space of the adapter function and one that is appropriate for this instruction. If the address space is invalid, then an exception condition is provided, STEP 1224. Otherwise, a determination is made as to whether load/store is blocked, INQUIRY 1226. In one example, this determination is made by checking the status indicator in the function table entry. If load/store is blocked, then an exception condition is provided, STEP 1228.

However, if the load/store is not blocked, a determination is made as to whether recovery is active, INQUIRY 1230. In one example, this determination is made by checking the recovery initiated indicator in the function table entry. If recovery is active, then an exception condition is provided, STEP 1232. Otherwise, a determination is made as to whether the function is busy, INQUIRY 1234. This determination is made by checking the busy indicator in the function table entry. If the function is busy, then a busy condition is provided, STEP 1236. With a busy condition, the instruction can be retried, instead of dropped.

If the function is not busy, then a further determination is made as to whether the offset specified in the instruction is valid, INQUIRY 1238. That is, is the offset in combination with the length of the operation within the base and length of the address space, as specified in the function table entry. If not, then an exception condition is provided, STEP 1240. However, if the offset is valid, then a determination is made as to whether the length is valid, INQUIRY 1242. That is, subject to the address space type, offset within the address space, and an integral boundary size is the length valid. If not, then an exception condition is provided, STEP 1244. Otherwise, processing continues with the store instruction. (In one embodiment, the firmware performs the above checks.)

Figure 12B:
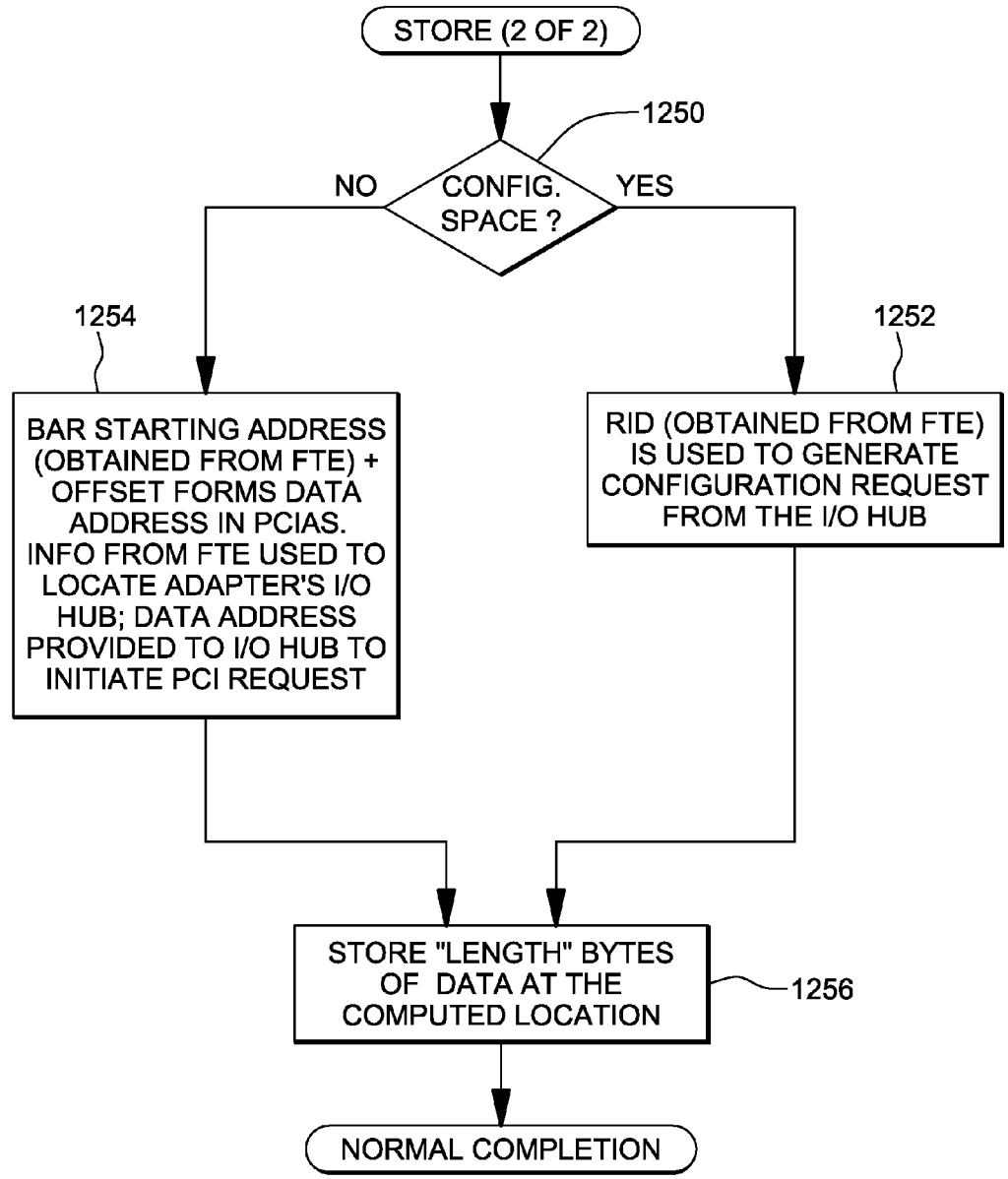

Continuing with FIG. 12B, a determination is made by the firmware as to whether the store is for a configuration address space of the adapter function, INQUIRY 1250. That is, based on the configuration of the adapter function's memory, is the specified address space provided in the instruction a configuration space. If so, then the firmware performs various processing to provide the request to a hub coupled to the adapter function; the hub then routes the request to the function, STEP 1252.

For example, the firmware obtains the requestor id from the function table entry pointed to by the function handle provided in the instruction operands. Further, the firmware determines based on information in the function table entry (e.g., the internal routing information) the hub to receive this request. That is, an environment may have one or more hubs and the firmware determines the hub coupled to the adapter function. It then forwards the request to the hub. The hub generates a configuration write request packet that flows out on the PCI bus to the adapter function identified by the RID in the function table entry. The configuration write request includes the RID and offset (i.e., data address) that are used to store the data, as described below.

Returning to INQUIRY 1250, if the designated address space is not a configuration space, then once again the firmware performs various processing to provide the request to the hub, STEP 1254. The firmware uses the handle to select a function table entry and from that entry it obtains information to locate the appropriate hub. It also calculates a data address to be used in the store operation. This address is calculated by adding the BAR starting address obtained from the function table entry to the offset provided in the instruction. This calculated data address is provided to the hub. The hub then takes that address and includes it in a request packet, such as a DMA write request packet, that flows out over the PCI bus to the adapter function.

Responsive to receiving the request either via STEP 1252 or STEP 1254, the adapter function stores the requested data at the specified location (i.e., at the data address), STEP 1256. The PCI Store operation concludes with an indication of success (e.g., setting a condition code of zero).

In addition to the load and store instructions, which typically load or store a maximum of, e.g., 8 bytes, another instruction that may be executed is a store block instruction. The store block instruction stores larger blocks of data (e.g., 16, 32, 64, 128 or 256 bytes) at a specified location in the adapter function; the block sizes are not necessarily limited to powers of two in size. In one example, the specified location is in a memory space of the adapter function (not an I/O or configuration space).

Figure 13A:
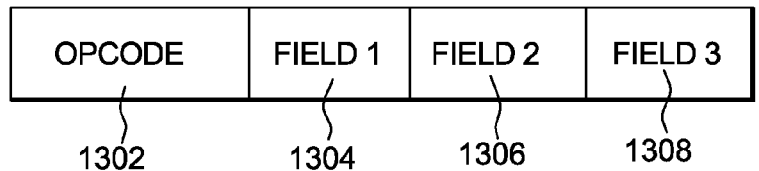
FIG. 13A depicts one embodiment of a PCI Store Block instruction used in accordance with an aspect of the present invention.

One embodiment of a PCI Store Block instruction is described with reference to FIG. 13A. As shown, a PCI Store Block instruction 1300 includes, for instance, an opcode 1302 indicating the PCI Store Block instruction; a first field 1304 specifying a location at which various information is included regarding the adapter function to which data is to be stored; a second field 1306 specifying a location that includes an offset within the specified address space into which the data is to be stored; and a third field 1308 specifying a location that includes a system memory address of data to be stored in the adapter function. The contents of the locations designated by Fields 1, 2 and 3 are further described below.

Figure 13B:
FIG. 13B depicts one embodiment of a field used by the PCI Store Block instruction of FIG. 13A, in accordance with an aspect of the present invention.

In one embodiment, Field 1 designates a general register that includes various information. As shown in FIG. 13B, the contents of the register include, for instance:

Enabled Handle 1310: This field is an enabled function handle of the adapter function to which the data is to be stored;

Address Space 1312: This field identifies the address space within the adapter function to which the data is to be stored;

Length field 1314: This field specifies the length of the store operation (e.g., the number of bytes to be stored); and Status field 1316: This field provides a status code which is applicable when the instruction completes with a predefined condition code.

Figure 13C:
FIG. 13C depicts one embodiment of another field used by the PCI Store Block instruction of FIG. 13A, in accordance with an aspect of the present invention.

In one example, Field 2 designates a general register, and as depicted in FIG. 13C, the contents of the register include a value (e.g., 64-bit unsigned integer) that specifies the offset within the specified address space into which the data is to be stored.

Figure 13D:
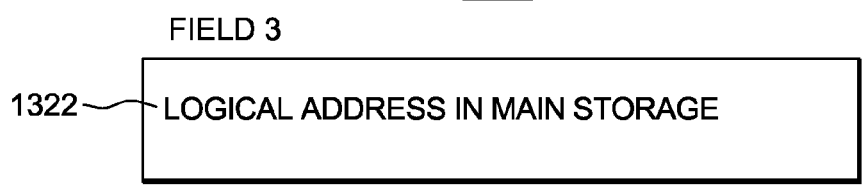
FIG. 13D depicts one embodiment of yet another field used by the PCI Store Block instruction of FIG. 13A, in accordance with an aspect of the present invention.

In one example, Field 3, as depicted in FIG. 13D, includes the logical address of the first byte of data in system memory 1322 to be stored in the adapter function.

One embodiment of the logic associated with a PCI Store Block instruction is described with reference to FIGS. 14A-14B. In one example, the instruction is issued by an operating system, and executed by the processor (e.g., firmware) executing the operating system.

To issue the instruction, the operating system provides the following operands to the instruction (e.g., in one or more registers designated by the instruction): the PCI function handle, the PCI address space (PCIAS), the offset into the PCI address space, the length of the data to be stored, and a pointer to the data to be stored. The pointer operand may comprise both a register and a signed or unsigned displacement. Upon successful completion of the PCI Store Block instruction, the data is stored in the location in the adapter designated by the instruction.

Figure 14A:
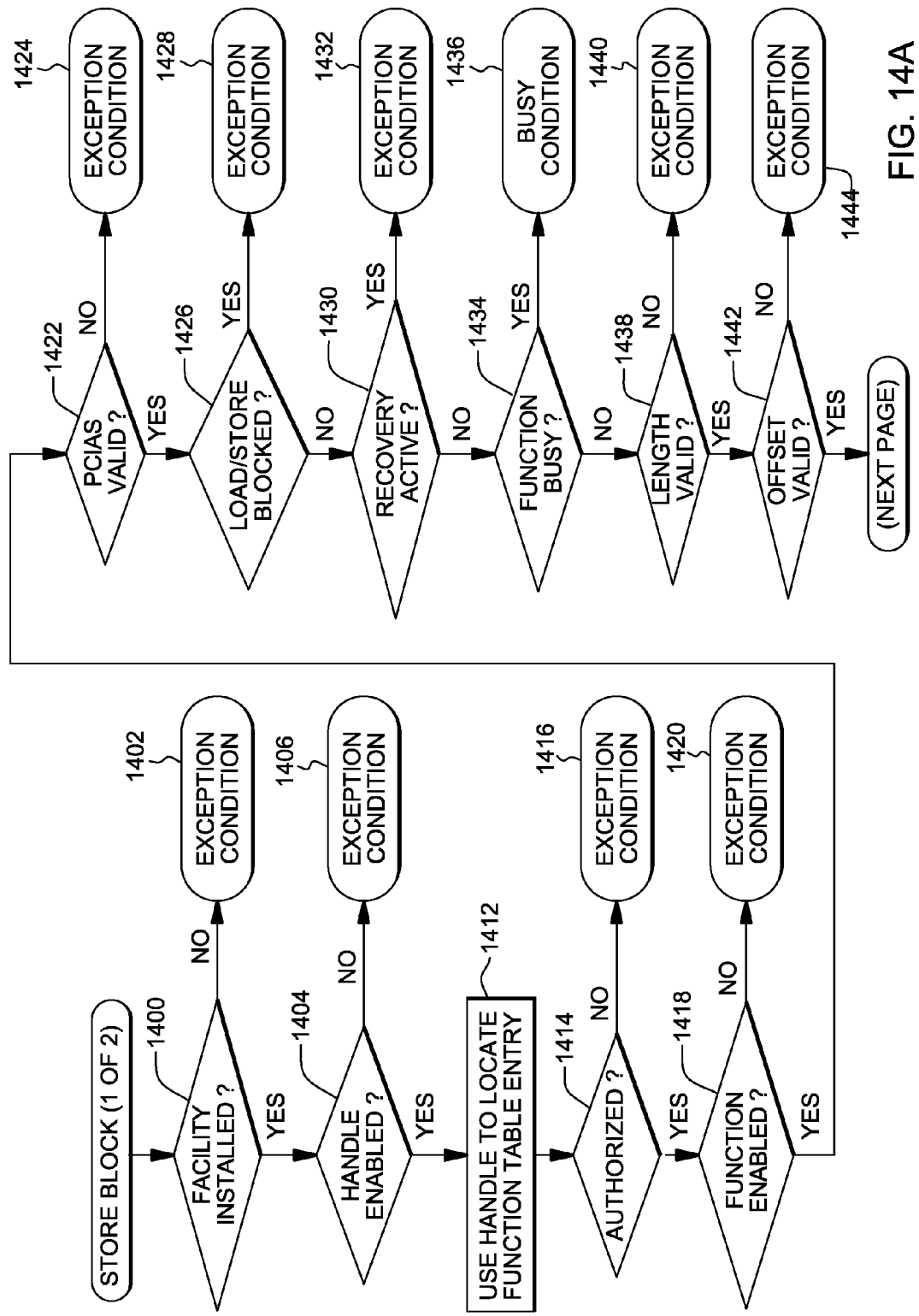
FIGS. 14A-14B depict one embodiment of the logic to perform a PCI Store Block operation, in accordance with an aspect of the present invention.

Referring to FIG. 14A, initially, a determination is made as to whether the facility allowing for a PCI Store Block instruction is installed, INQUIRY 1400. This determination is made by, for instance, checking an indicator stored in, for instance, a control block. If the facility is not installed, an exception condition is provided, STEP 1402. Otherwise, if the facility is installed, a determination is made as to whether the handle provided in the operands of the PCI Store Block instruction is enabled, INQUIRY 1404. In one example, this determination is made by checking an enable indicator in the handle. If the handle is not enabled, then an exception condition is provided, STEP 1406.

If the handle is enabled, then the handle is used to locate a function table entry, STEP 1412. That is, at least a portion of the handle is used as an index into the function table to locate the function table entry corresponding to the adapter function at which data is to be stored.

Thereafter, if the configuration issuing the instruction is a guest, a determination is made as to whether the function is configured for use by a guest, INQUIRY 1414. If it is not authorized, then an exception condition is provided, STEP 1416. This inquiry may be ignored if the configuration is not a guest or other authorizations may be checked, if designated.

A determination is then made as to whether the function is enabled, INQUIRY 1418. In one example, this determination is made by checking an enable indicator in the function table entry. If it is not enabled, then an exception condition is provided, STEP 1420.

If the function is enabled, then a determination is made as to whether the address space is valid, INQUIRY 1422. For instance, is the specified address space a designated address space of the adapter function and one that is appropriate for this instruction (i.e., a memory space). If the address space is invalid, then an exception condition is provided, STEP 1424. Otherwise, a determination is made as to whether load/store is blocked, INQUIRY 1426. In one example, this determination is made by checking the status indicator in the function table entry. If load/store is blocked, then an exception condition is provided, STEP 1428.

However, if the load/store is not blocked, a determination is made as to whether recovery is active, INQUIRY 1430. In one example, this determination is made by checking the recovery initiated indicator in the function table entry. If recovery is active, then an exception condition is provided, STEP 1432. Otherwise, a determination is made as to whether the function is busy, INQUIRY 1434. This determination is made by checking the busy indicator in the function table entry. If the function is busy, then a busy condition is provided, STEP 1436. With a busy condition, the instruction can be retried, instead of dropped.

If the function is not busy, then a further determination is made as to whether the offset specified in the instruction is valid, INQUIRY 1438. That is, is the offset in combination with the length of the operation within the base and length of the address space, as specified in the function table entry. If not, then an exception condition is provided, STEP 1440. However, if the offset is valid, then a determination is made as to whether the length is valid, INQUIRY 1442. That is, subject to the address space type, offset within the address space, and an integral boundary size is the length valid. If not, then an exception condition is provided, STEP 1444. Otherwise, processing continues with the store block instruction. (In one embodiment, the firmware performs the above checks.)

Figure 14B:
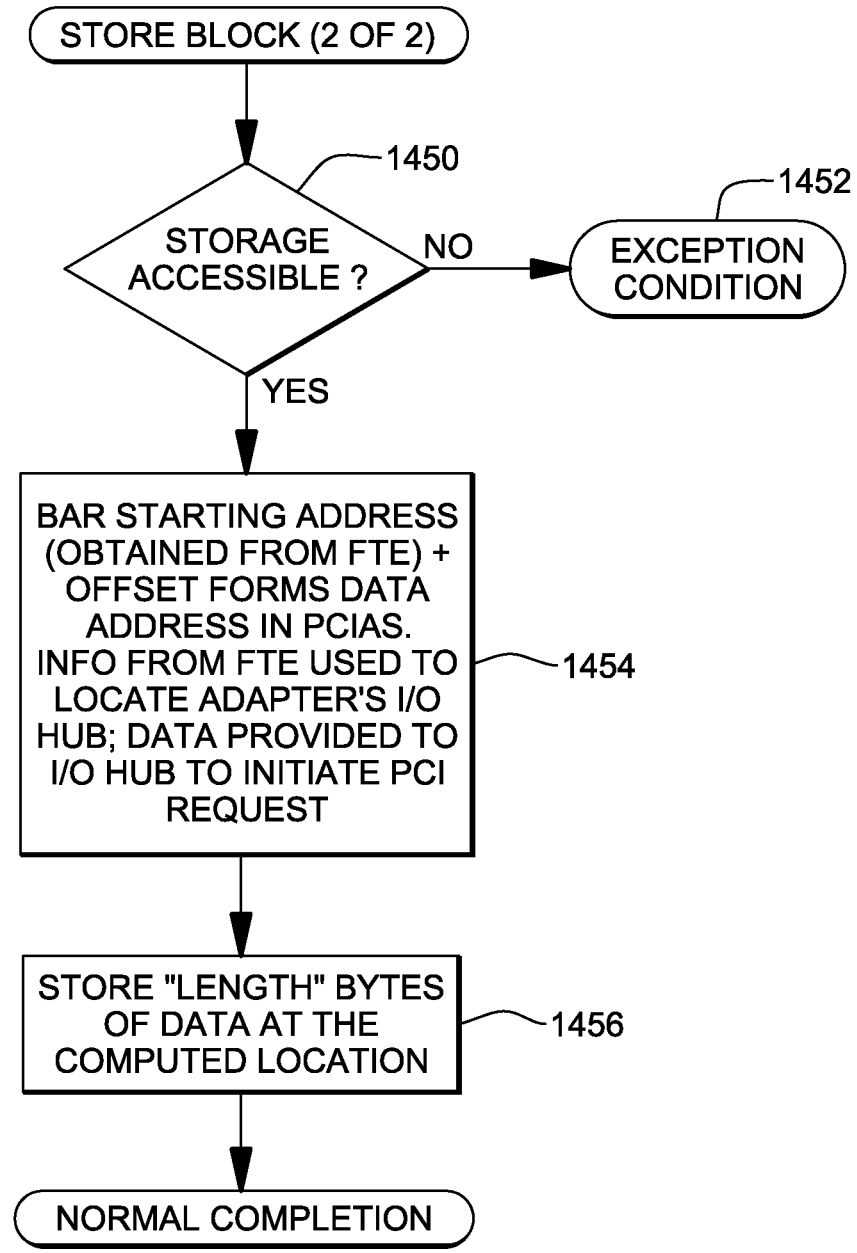

Continuing with FIG. 14B, a determination is made by the firmware as to whether the storage that includes the data to be stored is accessible, INQUIRY 1450. If not, an exception condition is provided, STEP 1452. If so, then the firmware performs various processing to provide the request to a hub coupled to the adapter function; the hub then routes the request to the function, STEP 1454.

For example, the firmware uses the handle to select a function table entry and from that entry it obtains information to locate the appropriate hub. It also calculates a data address to be used in the store block operation. This address is calculated by adding the BAR starting address (with the BAR being identified by the address space identifier) obtained from the function table entry to the offset provided in the instruction. This calculated data address is provided to the hub. In addition, the data referenced by the address provided in the instruction is fetched from system memory and provided to the I/O hub. The hub then takes that address and data and includes it in a request packet, such as a DMA write request packet, that flows out over the PCI bus to the adapter function.

Responsive to receiving the request, the adapter function stores the requested data at the specified location (i.e., at the data address), STEP 1456. The PCI Store Block operation concludes with an indication of success (e.g., setting a condition code of zero).

Described in detail above is a measurement facility in which PCI specific I/O traffic is tracked on a per function basis and the results are dynamically presented to the user (e.g., operating system, device driver of the operating system, other program, etc.). Specifically, on a per function basis, access instructions are tracked and direct memory access traffic is tallied. The measurements are device independent in which the types of devices do not need to be known beforehand.

The measurement facility provided herein enables tracking of resource usage in I/O subsystems that provide instructions to allow a program (e.g., operating system) direct access to the adapter functions. Resource usage is tracked without using debug tools and without having the operating system or the application instrumenting code to record such usage. The facility provided herein is integrated into the processor, thus being common to all operating systems and enabling the results to be available dynamically. Similarly, for measuring data transfer amounts, the capability is integrated into the I/O infrastructure with the results being available dynamically.

In one example, the measurement facility is enabled on a per function basis. Further, dynamically, the measurement values are pushed into user space on a per function basis, instead of having the user programs query for such information.

In the embodiments described herein, the adapters are PCI adapters. PCI, as used herein, refers to any adapters implemented according to a PCI-based specification as defined by the Peripheral Component Interconnect Special Interest Group (PCI-SIG), including but not limited to, PCI or PCIe. In one particular example, the Peripheral Component Interconnect Express (PCIe) is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the PCI-SIG.

Other applications filed on the same day include: U.S. Ser. No. 12/821,170, filed Jun. 23, 2010, entitled "Translation Of Input/Output Addresses To Memory Addresses," Craddock et al.; U.S. Ser. No. 12/821,171, filed Jun. 23, 2010, entitled "Runtime Determination Of Translation Formats For Adapter Functions," Craddock et al.; U.S. Ser. No. 12/821,172, filed Jun. 23, 2010, entitled "Resizing Address Spaces Concurrent To Accessing The Address Spaces," Craddock et al.; U.S. Ser. No. 12/821,174, filed Jun. 23, 2010, entitled "Multiple Address Spaces Per Adapter," Craddock et al.; U.S. Ser. No. 12/821,175, filed Jun. 23, 2010, entitled "Converting A Message Signaled Interruption Into An I/O Adapter Event Notification," Craddock et al.; U.S. Ser. No. 12/821,177, filed Jun. 23, 2010, entitled "Converting A Message Signaled Interruption Into An I/O Adapter Event Notification To A Guest Operating System," Brice et al.; U.S. Ser. No. 12/821,178, filed Jun. 23, 2010, entitled "Identification Of Types Of Sources Of Adapter Interruptions," Craddock et al.; U.S. Ser. No. 12/821,179, filed Jun. 23, 2010, entitled "Controlling A Rate At Which Adapter Interruption Requests Are Processed," Belmar et al.; U.S. Ser. No. 12/821,181, filed Jun. 23, 2010, entitled "Controlling The Selectively Setting Of Operational Parameters For An Adapter," Craddock et al.; U.S. Ser. No. 12/821,182, filed Jun. 23, 2010, entitled "Load Instruction for Communicating with Adapters," Craddock et al.; U.S. Ser. No. 12/821,184, filed Jun. 23, 2010, entitled "Controlling Access By A Configuration To An Adapter Function," Craddock et al.; U.S. Ser. No. 12/821,185, filed Jun. 23, 2010, entitled "Discovery By Operating System Of Information Relating To Adapter Functions Accessible To The Operating System," Coneski et al.; U.S. Ser. No. 12/821,187, filed Jun. 23, 2010, entitled "Enable/Disable Adapters Of A Computing Environment," Coneski et al.; U.S. Ser. No. 12/821,190, filed Jun. 23, 2010, entitled "Guest Access To Address Spaces Of Adapter," Craddock et al.; U.S. Ser. No. 12/821,191, filed Jun. 23, 2010, entitled "Managing Processing Associated With Hardware Events," Coneski et al.; U.S. Ser. No. 12/821,192, filed Jun. 23, 2010, entitled "Operating System Notification Of Actions To Be Taken Responsive To Adapter Events," Craddock et al.; U.S. Ser. No. 12/821,194, filed Jun. 23, 2010, entitled "Store/Store Block Instructions for Communicating with Adapters," Craddock et al.; U.S. Ser. No. 12/821,224, filed Jun. 21, 2010, entitled "Associating Input/Output Device Requests With Memory Associated With A Logical Partition," Craddock et al.; U.S. Ser. No. 12/821,247, filed Jun. 23, 2010, entitled "Scalable I/O Adapter Function Level Error Detection, Isolation, And Reporting," Craddock et al.; U.S. Ser. No. 12/821,256, filed Jun. 23, 2010, entitled "Switch Failover Control In A Multiprocessor Computer System," Bayer et al.; U.S. Ser. No. 12/821,242, filed Jun. 23, 2010, entitled "A System And Method For Downbound I/O Expansion Request And Response Processing In A PCIe Architecture," Gregg et al.; U.S. Ser. No. 12/821,243, filed Jun. 23, 2010, entitled "Upbound Input/Output Expansion Request And Response Processing In A PCIe Architecture," Gregg et al.; U.S. Ser. No. 12/821,245, filed Jun. 23, 2010, entitled "A System And Method For Routing I/O Expansion Requests And Responses In A PCIe Architecture," Lais et al.; U.S. Ser. No. 12/821,239, filed Jun. 23, 2010, entitled "Input/Output (I/O) Expansion Response Processing In A Peripheral Component Interconnect Express (PCIe) Environment," Gregg et al.; U.S. Ser. No. 12/821,271, filed Jun. 23, 2010 entitled "Memory Error Isolation And Recovery In A Multiprocessor Computer System," Check et al.; and U.S. Ser. No. 12/821,248, filed Jun. 23, 2010, entitled "Connected Input/Output Hub Management," Bayer et al., each of which is hereby incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 15:
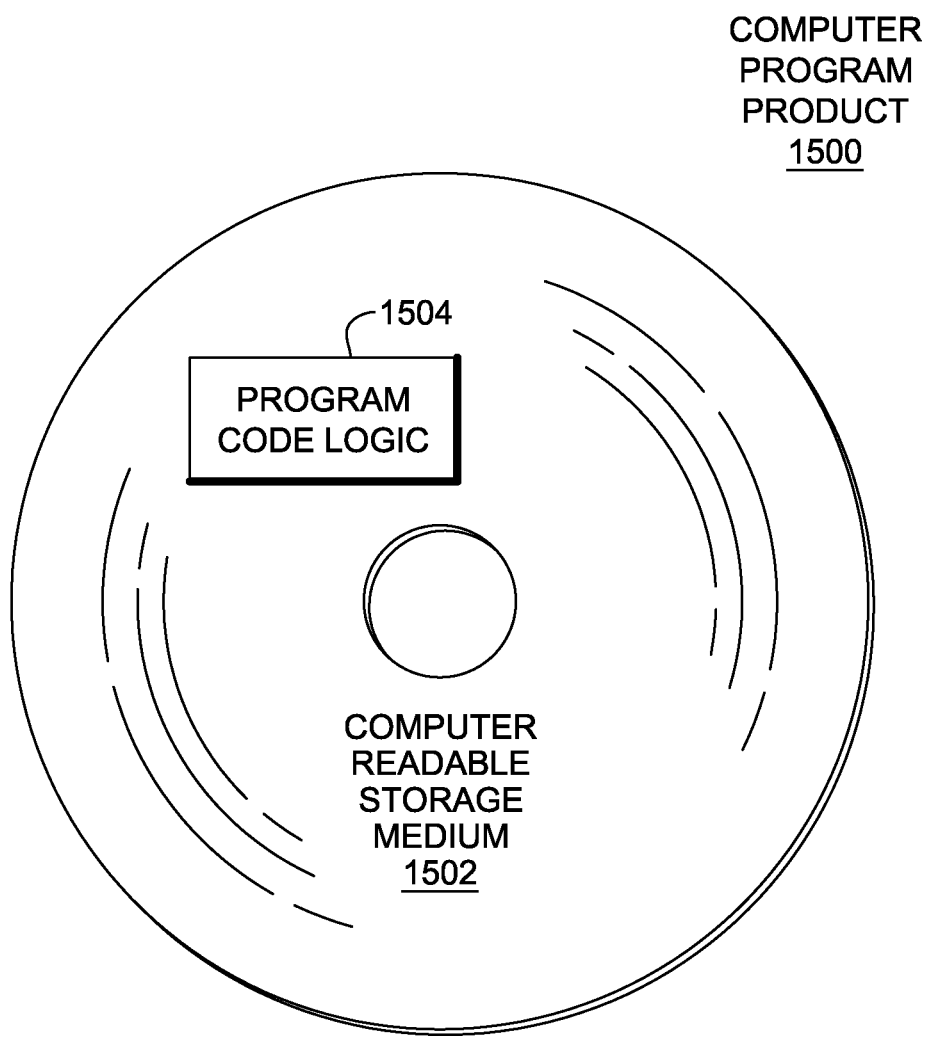
FIG. 15 depicts one embodiment of a computer program product incorporating one or more aspects of the present invention.

Referring now to FIG. 15, in one example, a computer program product 1500 includes, for instance, one or more computer readable storage media 1502 to store computer readable program code means or logic 1504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, although in the example herein, the adapters and PCI hub are considered a part of the server, in other embodiments, they do not have to necessarily be considered a part of the server, but can simply be considered as being coupled to system memory and/or other components of a computing environment. The computing environment need not be a server. Further, in other examples, the computing environment may be logically partitioned, and in such example, the counters are associated with a particular logical partition. Yet further, although the adapters are PCI based, one or more aspects of the present invention are usable with other adapters or other I/O components. Adapter and PCI adapter are just examples. Moreover, there may be more, less or different information tracked. Many variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 16:
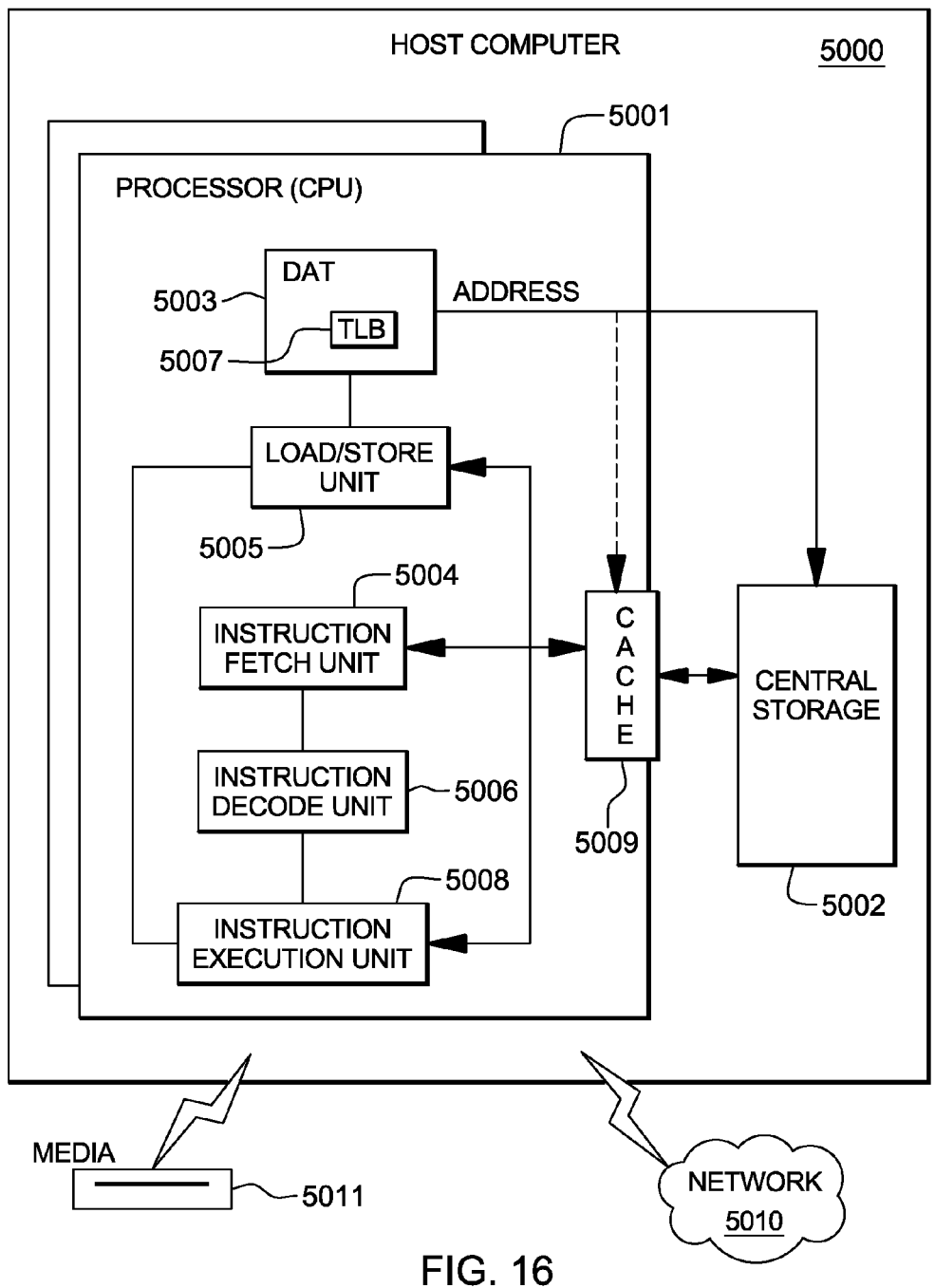
FIG. 16 depicts one embodiment of a host computer system to incorporate and use one or more aspects of the present invention.

Referring to FIG. 16, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 16, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 17:
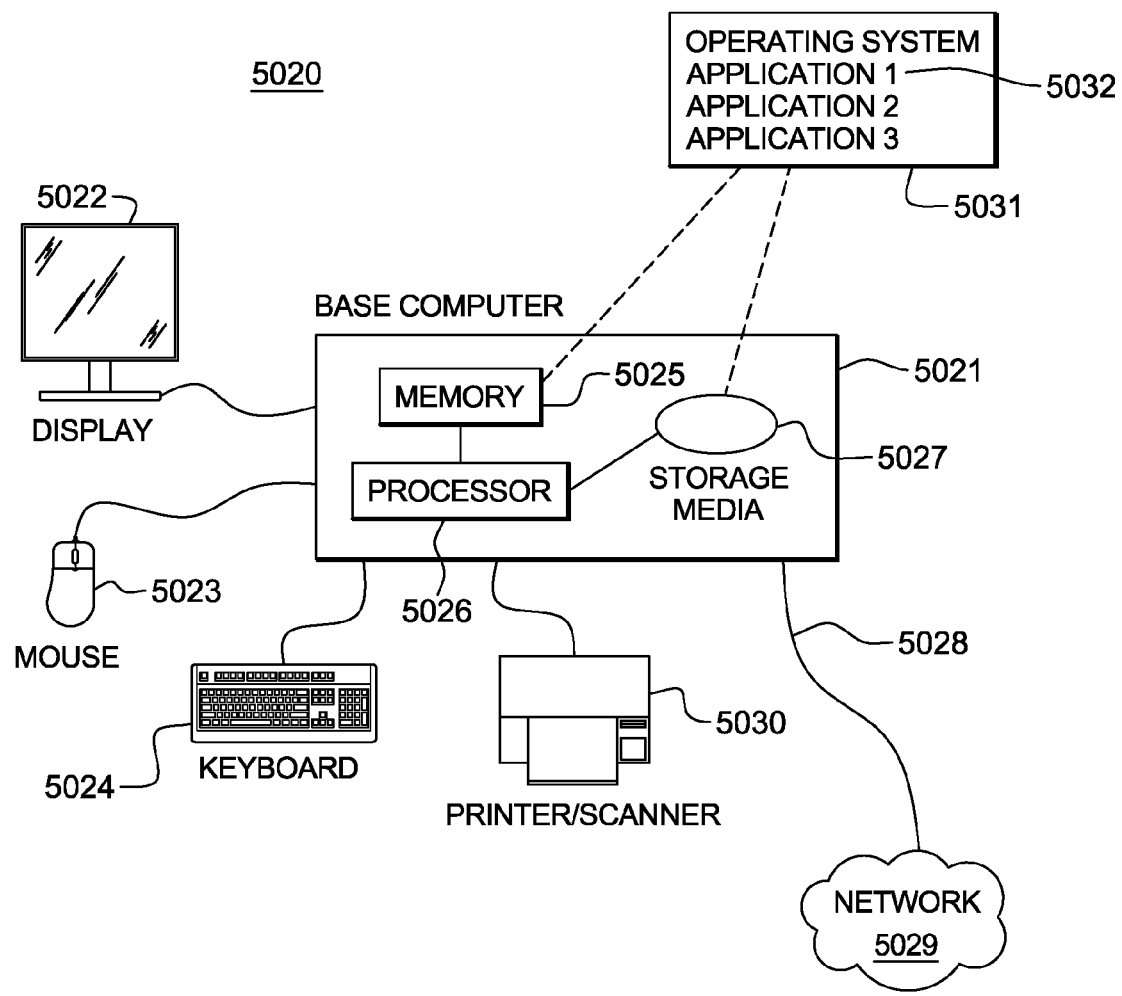
FIG. 17 depicts a further example of a computer system to incorporate and use one or more aspects of the present invention.

FIG. 17 illustrates a representative workstation or server hardware system in which the present invention may be practiced. The system 5020 of FIG. 17 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 18:
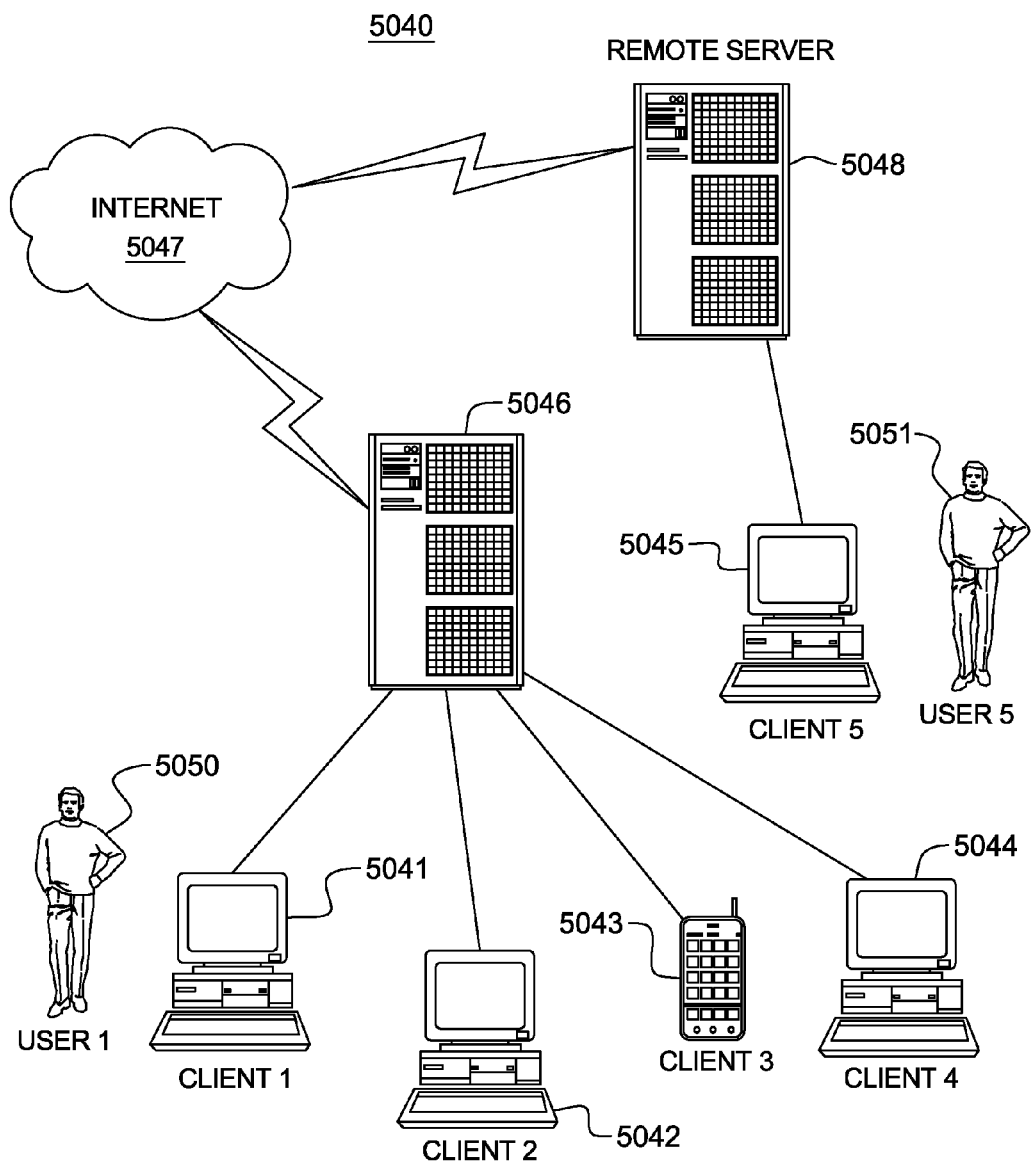
FIG. 18 depicts another example of a computer system comprising a computer network to incorporate and use one or more aspects of the present invention.

FIG. 18 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 18, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 17 and FIG. 18, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 19:
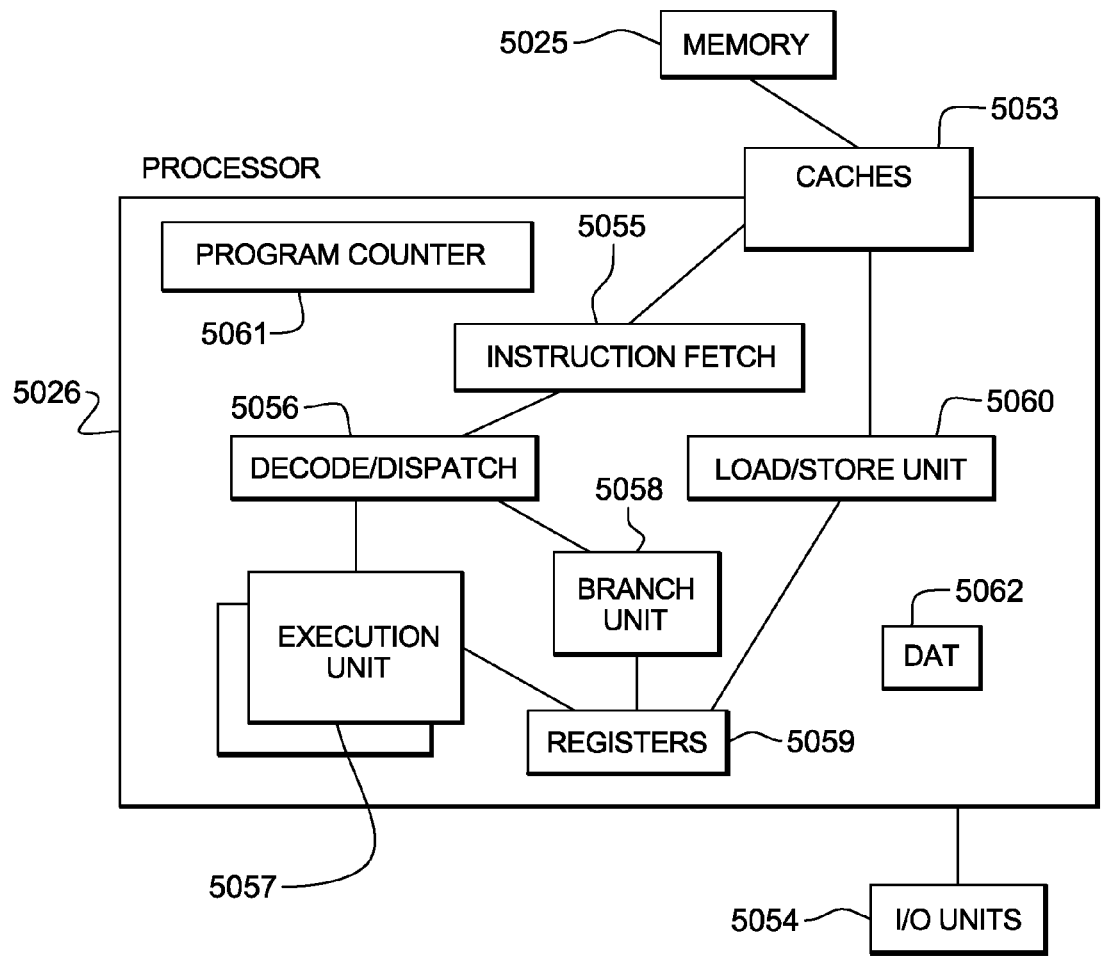
FIG. 19 depicts one embodiment of various elements of a computer system to incorporate and use one or more aspects of the present invention.

Referring to FIG. 19, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 20A:
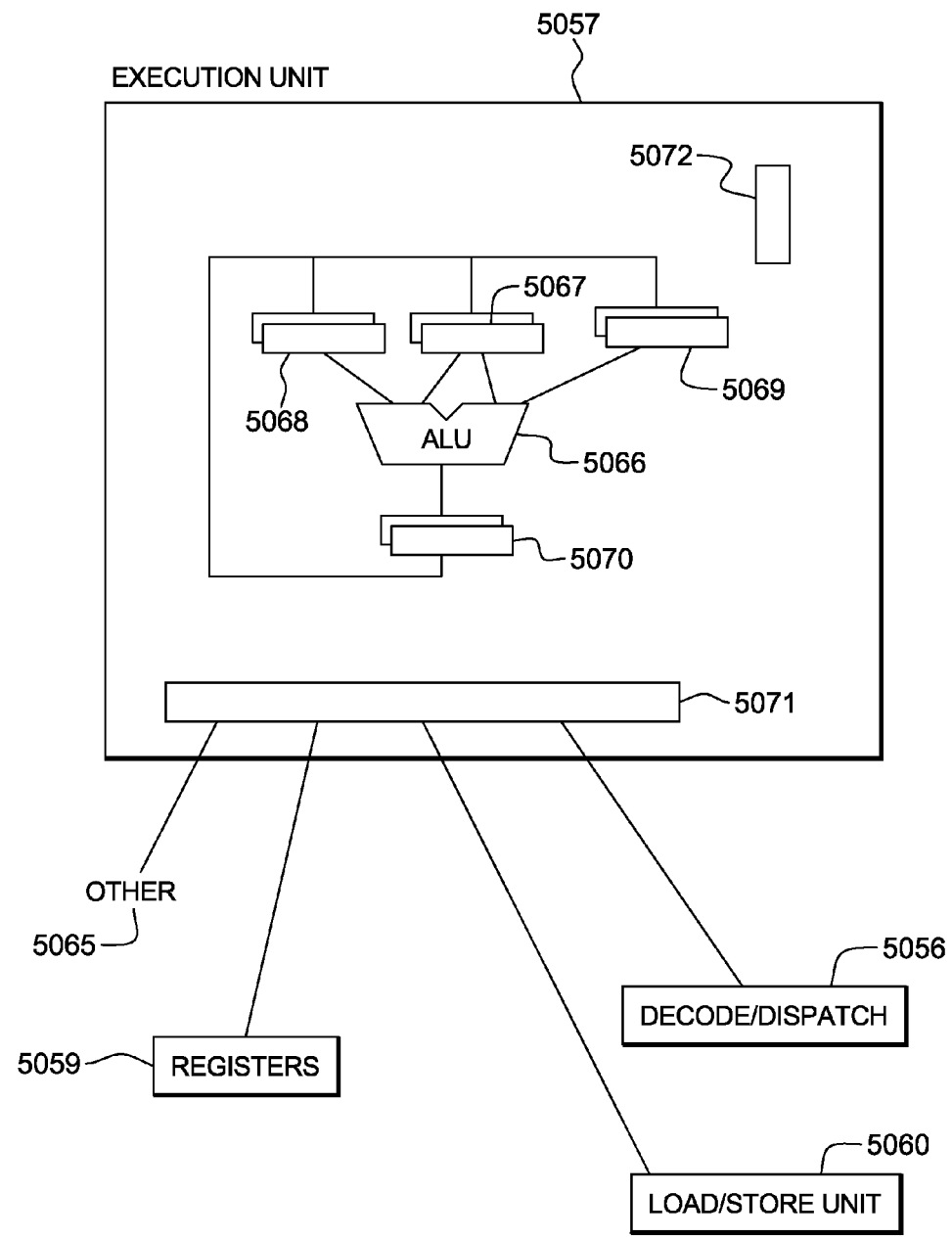
FIG. 20A depicts one embodiment of the execution unit of the computer system of FIG. 19 to incorporate and use one or more aspects of the present invention.

A processor 5026 typically has one or more units 5057, 5058, 5060 for executing the function of the instruction. Referring to FIG. 20A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 20B:
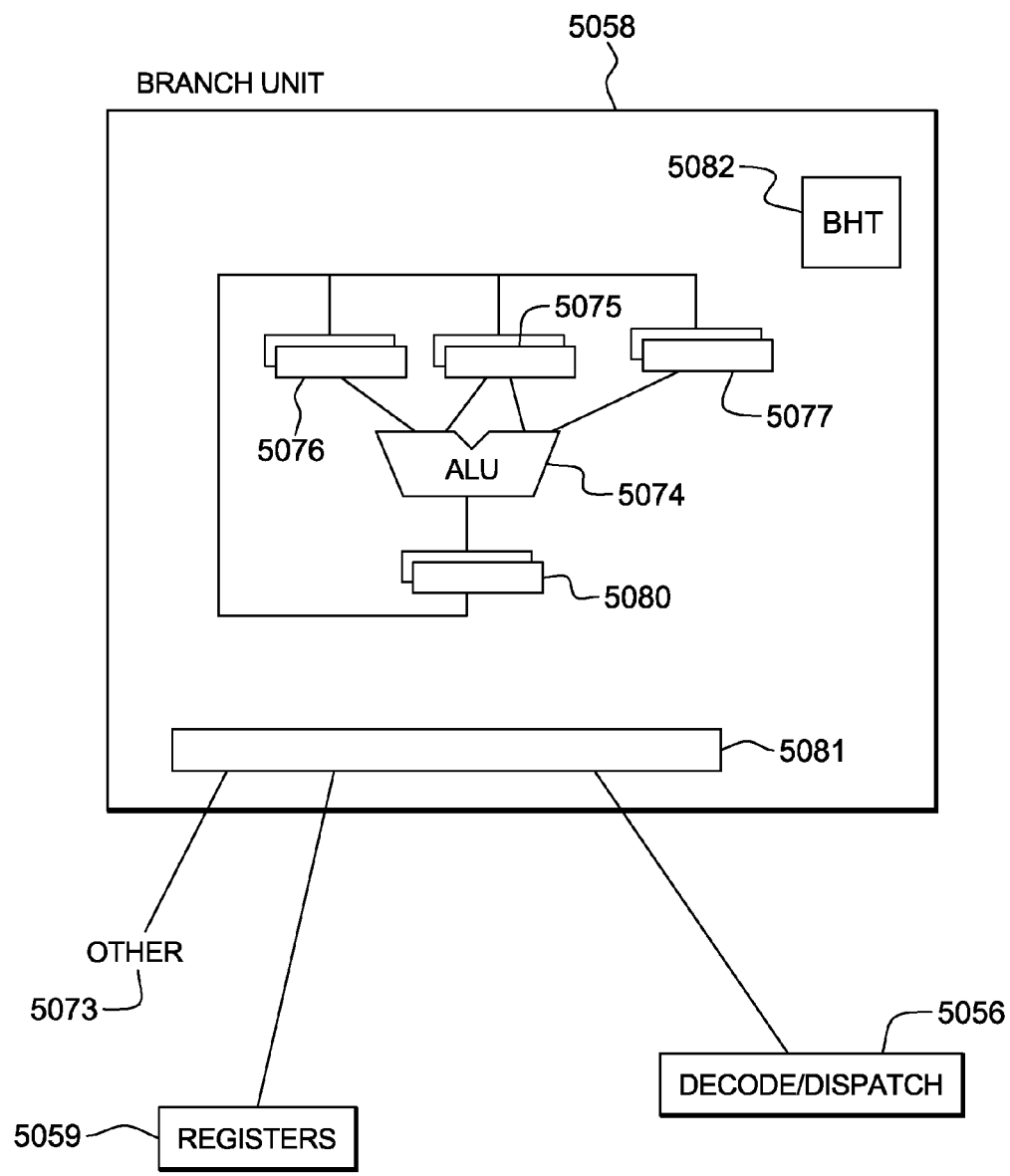
FIG. 20B depicts one embodiment of the branch unit of the computer system of FIG. 19 to incorporate and use one or more aspects of the present invention.

Referring to FIG. 20B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 20C:
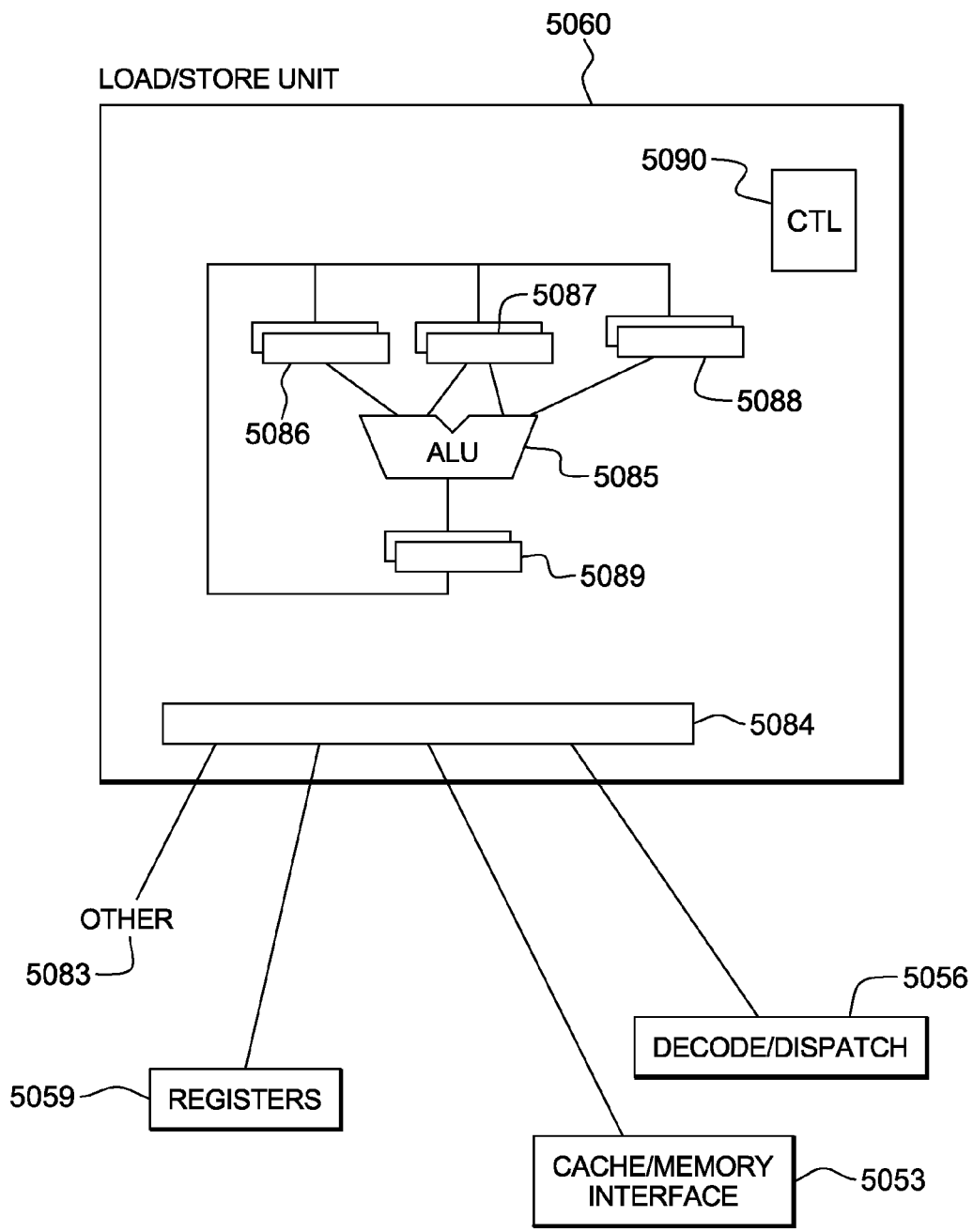
FIG. 20C depicts one embodiment of the load/store unit of the computer system of FIG. 19 to incorporate and use one or more aspects of the present invention.

Referring to FIG. 20C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multiprocessor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 19) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 21:
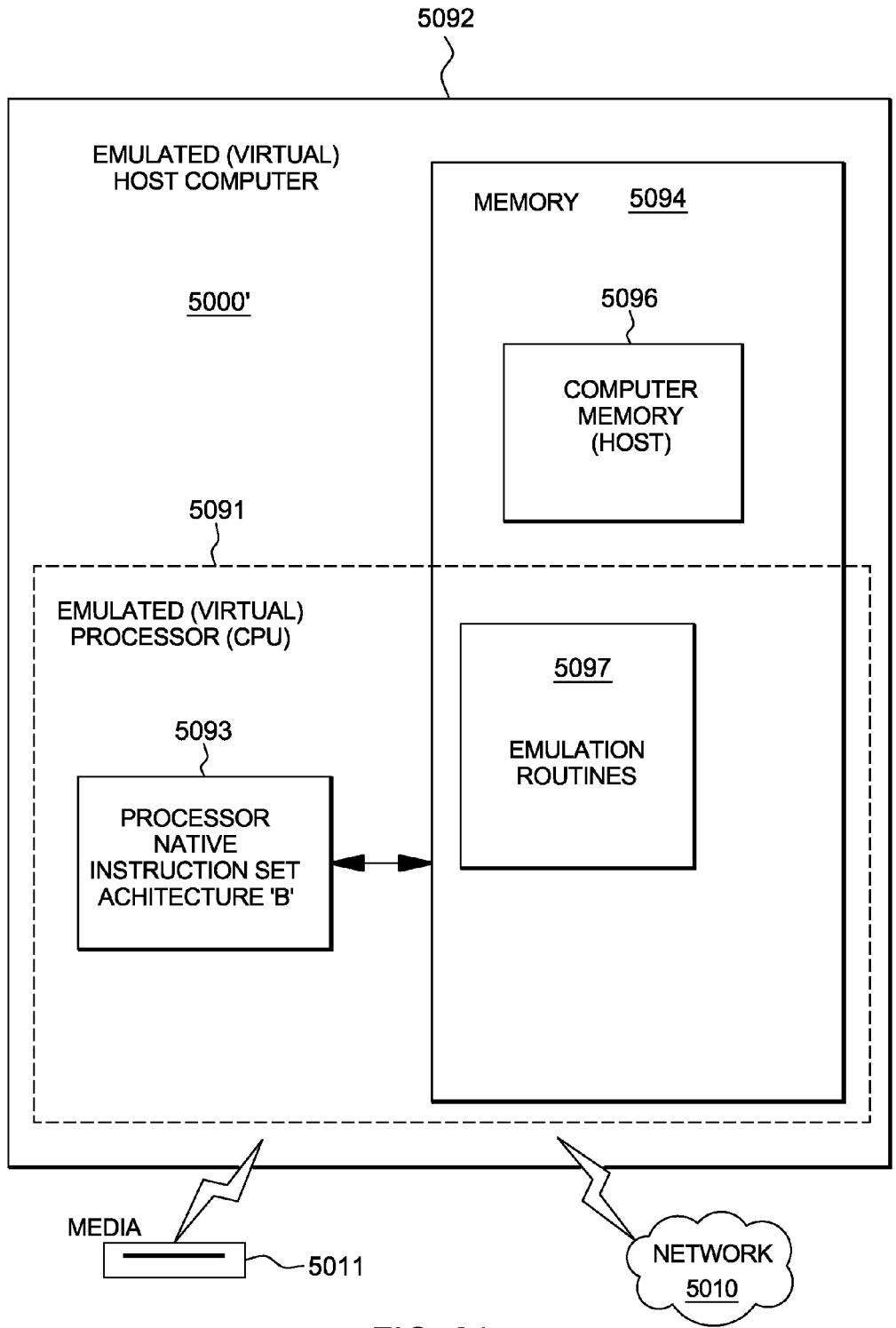
FIG. 21 depicts one embodiment of an emulated host computer system to incorporate and use one or more aspects of the present invention.

In FIG. 21, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines.

Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for measuring resource usage in a computing environment, said computer program product comprising:
   a non-transitory computer readable storage medium readable by a processing circuit and storing instructions for execution by the processing circuit for performing a method comprising:
   selectively registering a PCI function for measurement, the selectively registering comprising executing a Modify PCI Function Controls (MPFC) instruction to register the PCI function for measurement, the PCI function being identified in the MPFC instruction by a function handle, the function handle comprising a function number identifying the PCI function, the function number configured to address the PCI function and to index into a function table that includes one or more characteristics of the PCI function, and wherein the MPFC instruction specifies a location in memory for tracking information for the PCI function;
   determining that the PCI function is a (a) being accessed via an instruction or (b) requesting access of system memory coupled to the PCI function;
   tracking information specific to the PCI function, wherein the tracked information comprises a count of determined accessing instructions or a count of determined requested accesses to memory, and wherein the tracked information is on a per-function basis; and
   storing the tracked information in the location in memory.

2. The computer program product of claim 1, wherein the determining determines that the PCI function is being accessed by an instruction, and wherein the tracking further comprises:
   determining a type of the instruction, wherein there are a plurality of types of instructions; and
   updating a counter provided exclusively for that type of instruction and for the PCI function, wherein another counter is provided for another type of instruction for the PCI function.

3. The computer program product of claim 2, wherein there are a plurality of types of instructions including a PCI Load instruction, a PCI Store instruction, a PCI Store Block instruction, a PCI Modify instruction to perform a modify operation for the PCI function, and a PCI Refresh Translation instruction to update translation information used by the PCI function, each of which is specifically used to access the PCI function.

4. The computer program product of claim 1, wherein the determining determines that the PCI function is requesting a memory access operation, and wherein the tracking further comprises:
   determining a type of memory access operation; and
   updating a counter provided exclusively for the PCI function and that type of memory access operation.

5. The computer program product of claim 4, wherein there are a plurality of types of memory access operations including a read access and a write access.

6. The computer program product of claim 4, wherein the PCI function has a plurality of address spaces assigned thereto, and wherein the counter is specific to one address space of the plurality of address spaces.

7. The computer program product of claim 1, wherein the tracking comprises updating one or more counters, and wherein the one or more counters are specific to the PCI function and reflect input/output traffic associated with the PCI function.

8. The computer program product of claim 1, wherein the method further comprises automatically presenting the tracked information to a user.

9. The computer program product of claim 8, wherein the tracking comprises updating one or more counters, and wherein the automatically presenting comprises periodically updating a control block accessible to the user with values from the one or more counters.

10. The computer program product of claim 1, wherein the method further comprises determining whether tracking is to be performed for the PCI function, wherein tracking is enabled on a per-function basis, and performing the tracking based on determining that tracking is to be performed.

11. A computer system for measuring resource usage in a computing environment, said computer system comprising:
    a memory; and
    a processor in communications with the memory, wherein the computer system is configured to perform a method, said method comprising:
    selectively registering a PCI function for measurement, the selectively registering comprising executing a Modify PCI Function Controls (MPFC) instruction to register the PCI function for measurement, the PCI function being identified in the MPFC instruction by a function handle, the function handle comprising a function number identifying the PCI function, the function number configured to address the PCI function and to index into a function table that includes one or more characteristics of the PCI function, and wherein the MPFC instruction specifies a location in memory for tracking information for the PCI function;
    determining that the PCI function is (a) being accessed via an instruction or (b) requesting access of system memory coupled to the PCI function;

tracking information specific to the PCI function, wherein the tracked information comprises a count of determined accessing instructions or a count of determined requested accesses to memory, and wherein the tracked information is on a per-function basis; and storing the tracked information in the location in memory.

12. The computer system of claim 11, wherein the determining determines that the PCI function is being accessed by an instruction, and wherein the tracking further comprises:

determining a type of the instruction; and updating a counter provided exclusively for that type of instruction and for the PCI function.

13. The computer system of claim 11, wherein the determining determines that the PCI function is requesting a memory access operation, and wherein the tracking further comprises:

determining a type of memory access operation; and updating a counter provided exclusively for the PCI function and that type of memory access operation.

14. The computer system of claim 13, wherein the PCI function has a plurality of address spaces assigned thereto, and wherein the counter is specific to one address space of the plurality of address spaces.

15. The computer system of claim 11, wherein the method further comprises automatically presenting the tracked information to a user.

16. The computer system of claim 15, wherein the tracking comprises updating one or more counters, and wherein the automatically presenting comprises periodically updating a control block accessible to the user with values from the one or more counters.

17. The computer system of claim 11, wherein the method further comprises determining whether tracking is to be performed for the PCI function, wherein tracking is enabled on a per-function basis, and performing the tracking based on determining that tracking is to be performed.

18. A method of measuring resource usage in a computing environment, said method comprising:

selectively registering a PCI function for measurement, the selectively registering comprising executing, by a component of the computing environment, a Modify PCI Function Controls (MPFC) instruction to register the PCI function for measurement, the PCI function being identified in the MPFC instruction by a function handle, the function handle comprising a function number identifying the PCI function, the function number configured to address the PCI function and to index into a function table that includes one or more characteristics of the PCI function, and wherein the MPFC instruction specifies a location in memory for tracking information for the PCI function;

determining, by the component, that the PCI function is (a) being accessed via an instruction or (b) requesting access of system memory coupled to the PCI function;

tracking, by the component, information specific to the PCI function, wherein the tracked information comprises a count of determined accessing instructions or a count of determined requested accesses to memory, and wherein the tracked information is on a per-function basis; and storing the tracked information in the location in memory.

19. The method of claim 18, wherein the component is a processor and said processor determines that the PCI function is being accessed by an instruction, and wherein the tracking further comprises:

determining a type of the instruction; and updating a counter provided exclusively for that type of instruction and for the PCI function.

20. The method of claim 18, wherein the component is an input/output (I/O) hub of the computing environment and said I/O hub determines that the PCI function is requesting a memory access operation, and wherein the tracking further comprises:

determining a type of memory access operation; and updating a counter provided exclusively for the PCI function and that type of memory access operation.

* * * * *